United States Patent
McSheery

(10) Patent No.: US 10,778,049 B2
(45) Date of Patent: Sep. 15, 2020

(54) STATOR ASSEMBLY WITH STACK OF COATED CONDUCTORS

(71) Applicant: Sapphire Motors, San Leandro, CA (US)

(72) Inventor: Tracy McSheery, San Mateo, CA (US)

(73) Assignee: Sapphire Motors, San Leandro, CA (US)

( * ) Notice: Subject to any disclaimer, the term of this patent is extended or adjusted under 35 U.S.C. 154(b) by 276 days.

(21) Appl. No.: 15/612,886

(22) Filed: Jun. 2, 2017

(65) Prior Publication Data
US 2017/0353072 A1 Dec. 7, 2017

Related U.S. Application Data

(60) Provisional application No. 62/346,898, filed on Jun. 7, 2016.

(51) Int. Cl.
| | |
|---|---|
| *H02K 1/18* | (2006.01) |
| *H02K 16/02* | (2006.01) |
| *H02K 1/27* | (2006.01) |
| *H02K 16/00* | (2006.01) |
| *H02K 3/02* | (2006.01) |
| *H02K 3/32* | (2006.01) |
| *B60K 7/00* | (2006.01) |
| *H02K 1/17* | (2006.01) |

(Continued)

(52) U.S. Cl.
CPC ............ *H02K 1/182* (2013.01); *H02K 1/2793* (2013.01); *H02K 3/02* (2013.01); *H02K 3/32* (2013.01); *H02K 16/00* (2013.01); *H02K 16/02* (2013.01); *B60K 7/0007* (2013.01); *B60K 2007/0092* (2013.01); *H02K 1/17* (2013.01); *H02K 3/28* (2013.01); *H02K 3/30* (2013.01)

(58) Field of Classification Search
CPC ...... H02K 1/182; H02K 1/2793; H02K 16/00; H02K 16/02
USPC ..................................... 310/114, 156.32, 268
See application file for complete search history.

(56) References Cited

U.S. PATENT DOCUMENTS

| | | | | |
|---|---|---|---|---|
| 4,319,152 A | * | 3/1982 | Van Gils | ................. H01F 27/24 310/201 |
| 4,549,155 A | | 10/1985 | Halbach | |

(Continued)

FOREIGN PATENT DOCUMENTS

| | | |
|---|---|---|
| CN | 1218585 A | 9/2005 |
| CN | 103746486 A | 4/2014 |

(Continued)

OTHER PUBLICATIONS

International Search Report and Written Opinion for PCT Patent Application No. PCT/US2017/036213, dated Sep. 20, 2017, 12 pages.

(Continued)

*Primary Examiner* — Jeremy A Luks
(74) *Attorney, Agent, or Firm* — Compass IP Law PC

(57) ABSTRACT

A stator includes layers of coated conductor. The coating is insulative and provides electrical isolation of adjacent conductor layers. The multiple layers of coated conductor form a stator core, and the stator includes magnet assemblies that sandwich the stator core. The conductor layers stack in a direction orthogonal to a plane of the magnet assemblies. The conductor layers have a rectangular cross section.

25 Claims, 13 Drawing Sheets

(51) Int. Cl.
*H02K 3/28* (2006.01)
*H02K 3/30* (2006.01)

(56) References Cited

U.S. PATENT DOCUMENTS

| | | | |
|---|---|---|---|
| 4,761,584 A | 8/1988 | Halbach | |
| 4,916,345 A * | 4/1990 | Tong | F02N 11/04 |
| | | | 310/179 |
| 5,286,113 A | 2/1994 | Post | |
| 5,495,221 A | 2/1996 | Post | |
| 5,705,902 A | 1/1998 | Merritt et al. | |
| 5,744,896 A * | 4/1998 | Kessinger, Jr. | H02K 3/04 |
| | | | 310/198 |
| 5,789,841 A * | 8/1998 | Wang | H02K 3/28 |
| | | | 310/179 |
| 6,137,203 A * | 10/2000 | Jermakian | H02K 1/2793 |
| | | | 310/191 |
| 6,181,048 B1 * | 1/2001 | Smith | H02K 3/04 |
| | | | 310/156.36 |
| 6,348,751 B1 * | 2/2002 | Jermakian | H02K 1/2793 |
| | | | 310/207 |
| 6,858,962 B2 | 2/2005 | Post | |
| 6,906,446 B2 | 6/2005 | Post | |
| 7,078,838 B2 | 7/2006 | Post | |
| 7,402,934 B1 * | 7/2008 | Gabrys | H02K 3/345 |
| | | | 310/179 |
| 7,646,132 B2 * | 1/2010 | Halstead | H02K 3/04 |
| | | | 310/156.32 |
| 7,795,773 B1 | 9/2010 | Wittig | |
| 8,261,429 B2 * | 9/2012 | Halstead | H02K 3/04 |
| | | | 29/596 |
| 8,264,121 B2 | 9/2012 | Post | |
| 8,643,249 B2 | 2/2014 | Post | |
| 10,141,805 B2 * | 11/2018 | Sromin | H02K 21/24 |
| 2008/0231136 A1 | 9/2008 | Obata | |
| 2013/0088117 A1 * | 4/2013 | Boughtwood | H02N 1/004 |
| | | | 310/300 |
| 2015/0123507 A1 * | 5/2015 | Degtyar | H02K 1/2793 |
| | | | 310/156.37 |
| 2016/0126794 A1 * | 5/2016 | Gery | H02K 1/2753 |
| | | | 310/60 R |
| 2017/0054339 A1 | 2/2017 | Harakawa et al. | |
| 2017/0126079 A1 * | 5/2017 | Klassen | H02K 1/20 |
| 2017/0148547 A1 * | 5/2017 | Dolan | C25D 9/12 |
| 2017/0353092 A1 | 12/2017 | Park et al. | |
| 2018/0076677 A1 | 3/2018 | Yamada et al. | |
| 2018/0076746 A1 | 3/2018 | Omura | |
| 2018/0109169 A1 | 4/2018 | Chi-Hsueh et al. | |
| 2018/0123410 A1 | 5/2018 | Hasebe et al. | |

FOREIGN PATENT DOCUMENTS

| | | |
|---|---|---|
| DE | 102006044001 A1 | 3/2008 |
| JP | 62145476 U | 9/1987 |
| JP | 2008141888 | 6/2008 |
| JP | 2010055806 | 3/2010 |
| JP | 2011109785 B | 4/2014 |
| JP | 2016005350 A | 1/2016 |
| WO | 2015098159 A1 | 7/2015 |

OTHER PUBLICATIONS

Jeff Brown, "High Efficiency Permanent Magnet Motor" Marand Precision Engineering Oct. 27, 2010, 18 pages.
John Petro, "Achieving High Electric Motor Efficiency" NovaTorque, Inc., EEMODS 2011—Paper 060, 12 pages.
Extended European Search Report for Patent Application No. 17 810 886.6, dated Dec. 9, 2019, 9 pages.
Chinese and English Translation of P.R. China State Intellectual Property Office First Office Action for Patent Application No. 201780045512.1, dated May 21, 2020, 24 pages.

* cited by examiner

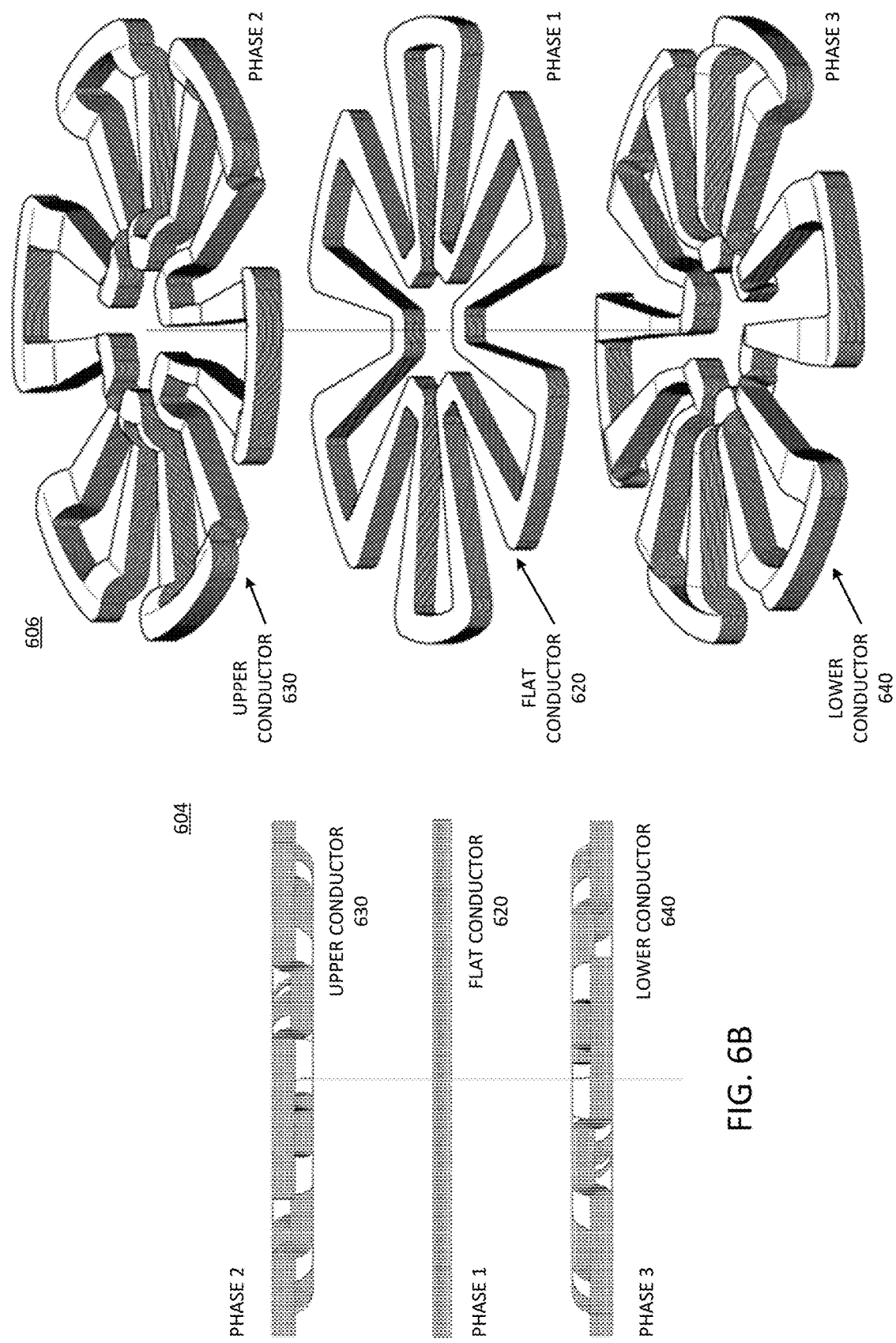

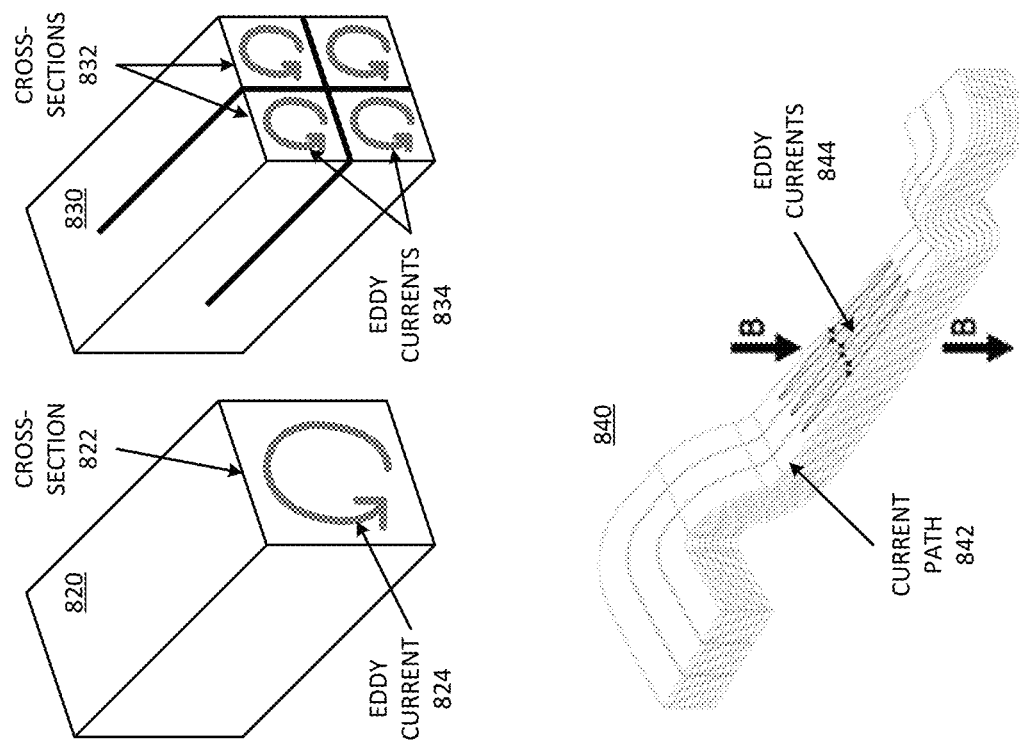
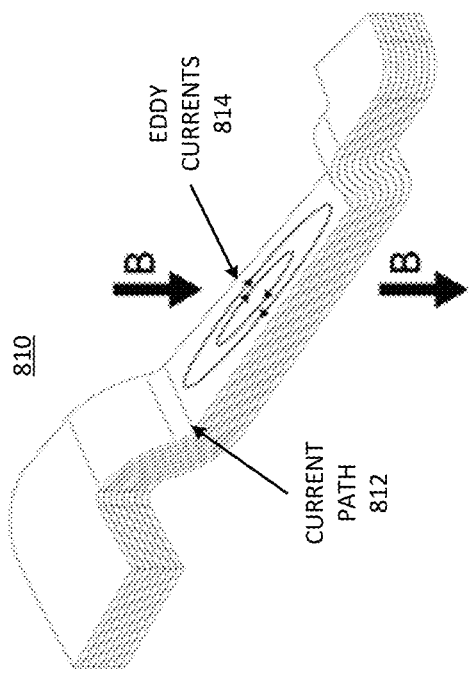
FIG. 8A
FIG. 8B

STATOR ASSEMBLY WITH STACK OF COATED CONDUCTORS

PRIORITY

The present application is a nonprovisional application based on U.S. Provisional Application No. 62/346,898, filed Jun. 7, 2016. The present application claims the benefit of priority of that application. The provisional application is hereby incorporated by reference herein.

FIELD

The descriptions are generally related to motors, and more particular descriptions are related to stators.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2016, 2017, Sapphire Motors, All Rights Reserved.

BACKGROUND

Electric motors are used in devices that range from small appliances and electronic devices to large motors for pumps and factors. Motors are one of the world's largest consumers of electricity, but are traditionally either very inefficient or very expensive. Energy efficiency for a motor refers to how much of the electrical energy input is converted to work output from the motor. Small appliance motors in the home traditionally have an efficiency slightly better than 50 percent. Large motors for pumps and factories often have efficiencies in excess of 90 percent, but are very expensive. Linear motors move equipment at high speeds and actuate along one axis, while rotary motors turn a shaft and often are geared to trade speed for torque.

Traditional motors use magnet wire wound around steel to create a stator. The magnet wire is typically a thinly coated insulator over a conductor of copper, aluminum, or other metal, which produces a controllable electromagnet. Typically, the stator includes different magnetic arrays. The windings can be mechanically or digitally switched to align the fields of the magnetic arrays, where the stator generates an electromotive force by timing the changes in magnetic flux.

In a traditional motor, the stator often consists of multiple windings insulated by paper, enamel, or some plastic such as polyimide films that are usually thin to allow maximum current capabilities in relationship to the available volume of conductor. Making the insulation thicker to prevent shorts between windings would both decrease the amount of available conductor in a pole with a fixed volume available for windings, and increase the resistance of the stator windings. Motor efficiency increases as losses decrease, but the motor losses increase proportional to the square of the current multiplied by the resistance. Thus, increased winding resistance decreases motor efficiency. Additionally, traditional dielectrics or wire coatings for magnetic wire are good thermal insulators, which means increased coating thickness operates to increase the retention of heat in the wire. The thermal performance of wire coatings creates a contradiction in performance, where increasing the thickness allows higher voltages, but promotes overheating. Thin wire insulation is a major cause of motor failure in traditional designs, and overheating limitations define motor system performance envelopes.

FIG. 1 illustrates a diagram of a cross section of a traditional motor with coils wrapped around steel laminations. An example of a motor 100 can include four or six coils 130 (six coils are shown) wound around steel laminations 120 with the magnetic circuit representative of a standard arrangement for linear or rotary motors. Center 110 is a center of rotation for motor 100, and can be the location of a rod or shaft. The use of back iron behind the permanent magnets to complete the magnetic circuit and laminations in the armature core to increase the field strength at the gap improves performance, but has intrinsic weight, cost, eddy current, and hysteresis loss penalties. The relatively low number of magnetic poles in both the rotor and stator contribute to high torque ripple. The large amount of steel increases the field strength, but has high eddy current and hysteresis losses, while making motor 100 heavy.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 6B is a diagram of an embodiment of a cross section view of the stacking of the three phases of conductors into a stator assembly.

FIG. 6C is a diagram of an embodiment of a perspective view of the stacking of the three phases of conductors into a stator assembly.

FIG. 8A is a diagram of an embodiment of a conductor separated into multiple segments to reduce current loops.

FIG. 8B is a diagram of an embodiment of eddy current in a conductor with a segmented current path.

Figure 1:
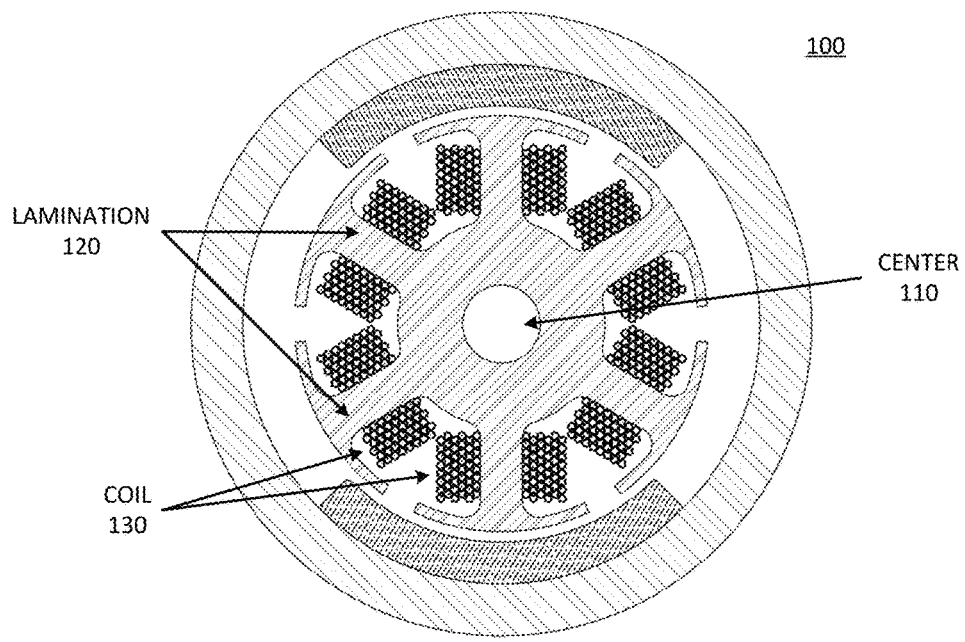
FIG. 1 is a diagram of a cross section of a traditional motor with coils wrapped around steel laminations.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a stator assembly includes layers of coated conductor. The coating is insulative and provides electrical isolation of adjacent conductor layers. The multiple layers of coated conductor form a stator core, and the stator includes magnet assemblies that sandwich the stator core. The conductor layers have a rectangular cross section.

In contrast to wire windings as a stator conductor, the stator assembly includes coated conductor, with a variable or non-constant cross section. In one embodiment, the stator assembly includes sapphire coated aluminum layers. Coated conductor layers in the stator can enable high performance motors to be built combining the best tradeoffs between minimizing the resistive losses and minimizing the eddy current losses. In one embodiment, the coating includes anodizing to produce microcrystals of sapphire or aluminum oxide, which has excellent insulative performance as well as excellent thermal conductivity. More specifically, the electrical insulation and thermal conductivity of sapphire on aluminum is improved relative to typical plastic, silicon, resin, or other traditional wire insulator. The improved properties decrease the likelihood of motor burnout or failure. In one embodiment, the processing patterns the conductor to reduce eddy current losses. In one embodiment, the processing patterns the conductor to improve fill factor to increase conductivity. In one embodiment, the patterning can provide both fill factor improvement as well as eddy current reduction.

The stator assembly in a motor can provide motors and electromotive devices with high efficiencies that are robust and allow overpowering beyond nominal ratings. For example, in one embodiment, a motor can temporarily be operated beyond normal ratings for temporary surges of power. For example, with proper thermal conductivity and electrical insulation with the coated conductor, temporary surges of approximately 200 percent or more power can be achieved. Typically the ratings refer to limits for sustained or prolonged operation. But with thermal conductivity and electrical insulation, temporary surges will not cause the breakdown of the motor. Thus, motors can be designed for efficiency in size and speed, while allowing bursts of power. Such a design allows the use of a smaller motor as compared to traditional design, which requires designing to the ratings seeing that even short durations of power can cause damage to a traditional motor.

Wire has a constant cross section. In one embodiment, the coated conductor is created from a chemical reaction of the conductor metal, such as sapphire coated aluminum, where sapphire is understood to be aluminum oxide. In one embodiment, the coated conductor is created from a chemical deposition or other process to provide a nano-layer of material on a conductor, such as diamond coated copper. The stator core includes a conductor with a high thermal transport coating material, where the coating has a high dielectric constant insulating the metal. In one embodiment, the insulative coating includes a traditional insulator, silicon, or a diamond-like coating. In one embodiment, the conductor with insulative coating is patterned to create magnetic fields for a linear motor or a rotary motor, and provides greater efficiencies, increased power density, and reliability. The use of advanced manufacturing techniques can result in lower motor costs than traditional motors that have windings on an iron-based core.

The stator core includes layers or one or more stacks of coated conductor. In one embodiment, the patterning of the conductor layers allows placing more conductor in a tighter volume, which reduces resistive losses. Thus, the stator can include multiple layers in a three dimensional shape. Multiple thin layers of coated conductor reduces the cross-sectional area of the conductor, which reduces eddy current losses relative to a conductor with a larger cross-sectional area. The cross section is not typically a consideration in traditional motors, seeing that insulated wire windings are used, which constrains the eddy currents.

Winding the wires around an iron-based motor core results in a manufacturing cost, even with automated manufacturing processes. The layers of coated conductor can be processed with mechanical equipment (e.g., die-stamping machines), laser or other precision-processing machining, or other manufacturing processes. With such processes, the conductor layers can be manufactured at a cost comparable to traditional motors, rather than high-end costs that might otherwise result.

Figure 2:
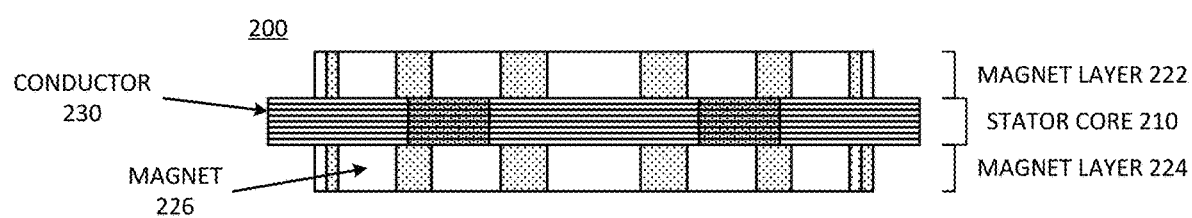
FIG. 2 is a diagram of an embodiment of a stator assembly with a stator core of layers of coated conductor.

FIG. 2 is a diagram of an embodiment of a stator assembly with a stator core of layers of coated conductor. In one embodiment, assembly 200 includes stator core 210 between magnet layers 222 and 224. Magnet layers 222 and 224 include multiple permanent magnets arranged radially in a pattern to place the magnetic poles orthogonal to a rotational motion of the stator. While two magnet layers 222 and 224 are illustrated in assembly 200, it will be understood that an alternate stator assembly could include two conductor layers with a single magnet layer. The array of magnets can each include one or more magnets containing single or multiple magnetic pole pairs each.

In one embodiment, magnet layers 222 and 224 include a Halbach array. A Halbach array alternates the orientation of magnets with overlapping fields, with one set oriented to produce fields parallel to the working air gap ("North-South"), while additional magnets produce fields perpendicular to the air gap ("East-West"). With such an arrangement, the fields add magnetic flux on one side of the first array and cancel flux on the other, producing a greater magnetic field density where desired, and reducing the field where not beneficial without the need for a soft magnetic return path. The Halbach array can provide many variations of linear, cylindrical, and axial flux arrays. Any Halbach array will benefit from use with the layered coated conductor stators described throughout.

As illustrated, stator core 210 includes multiple layers of conductor 230 stacked on top of each other between the magnet layers. Conductors 230 include a cross section that is rectangular, and has a pattern to provide an electrical path radially around the stator within the conductor layer. In one embodiment, conductors 230 are patterned to stack with another group of conductor layers to increase the density of conductor within stator core 210.

In a traditional motor the stator often consists of multiple windings insulated by paper, enamel, or some plastic such as polyimide films that are usually thin to allow maximum current capabilities in relationship to the available volume. Decreasing the amount of available conductor in a pole with a fixed volume available for windings, by making the insulation thicker, would increase the required volume for insulation needed to prevent shorts between windings. Increasing the required volume of insulation increases the resistance of the stator windings, and increases the losses proportional to the square of the current multiplied by the resistance. It would also increase the retention of heat in the wire as most dielectrics used for magnet wire are good thermal insulators, creating a contradiction in performance, where increasing the thickness allows higher voltages, but promotes overheating. The thinness of the insulation is a major cause of motor failure in traditional designs and overheating limitations define motor system performance envelopes.

Copper is often the preferred conductor for motor windings, especially in small motors, due to superior electrical conductivity versus aluminum. Wire is traditionally extruded with a constant cross section and then coated with an insulating layer and wound in coils to provide a switchable magnetic field. The desired motor characteristics determine the winding choice in terms of thickness, number of windings and configuration. In general, eddy currents can be reduced by increasing the number of smaller parallel strands, but such an approach has a penalty in terms of the volume efficiency or packing density. Sixty percent more aluminum by cross-sectional area is needed to provide the same conductivity as the equivalent length of copper.

Many commonly used dielectrics are flammable, and will combust at the high temperatures possible in overheating conditions, made worse by the thermal insulating characteristics of these coatings. Thinner materials can fail both mechanically and electrically. Motor failure occurs when the losses which produce heat destroy the insulating material between the conductors, which can be referred to as insulation, dielectric, or coating. The destruction of the insulation produces a short which decreases the magnetic field, causing the power supply to try to drive the motor with even more current or voltage. When more current flows through the short, the conductor further heats up the affected region or creates a mechanical failure. Motors that experience such shorts have to be stripped and rewound, with associated costs of broken equipment, downtime, and repair costs. In many cases the complexity of manufacturing the windings creates high costs which are impractical to manufacture in mass production quantities.

Figure 3A:
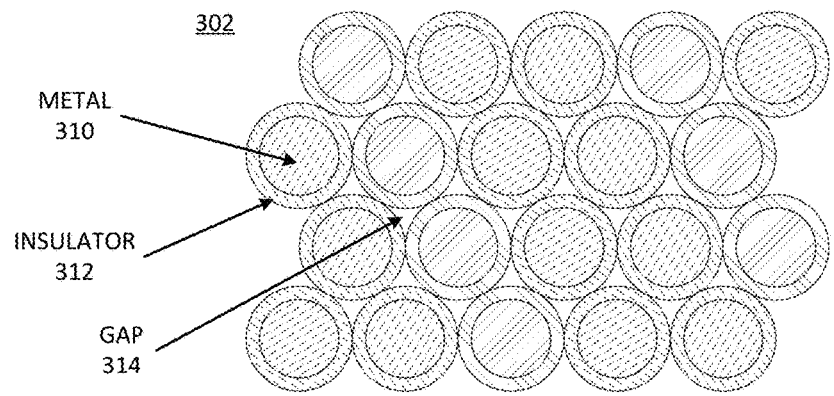
FIG. 3A is a diagram of an embodiment of coated round wire.

FIG. 3A is a diagram of an embodiment of coated round wire. Windings 302 include metal wire 310 coated with insulator 312. An increase of conductor in a given volume can increase the magnetic field. With windings 302, metal 310 has a round cross-section, and careful winding of the conductor can reduce gaps 314 between individual strands of conductors.

Figure 3B:
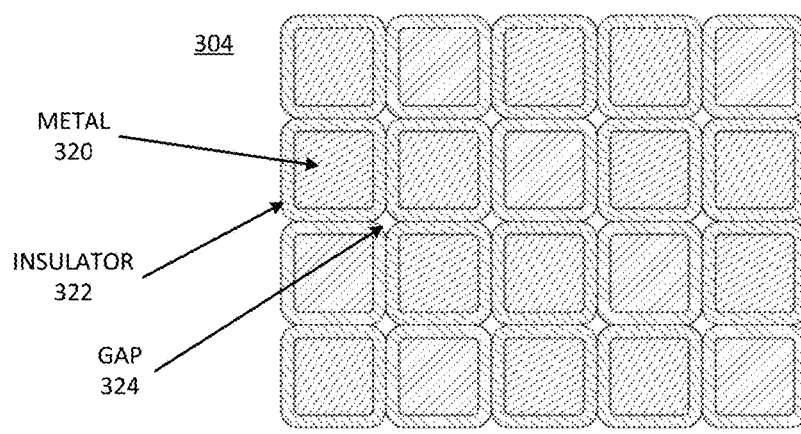
FIG. 3B is a diagram of an embodiment of coated square wire.

FIG. 3B is a diagram of an embodiment of coated square wire. Windings 304 include metal wire 320 coated with insulator 322. With windings 304, metal 320 has a square cross-section, and careful winding of the conductor can reduce gaps 324 between individual strands of conductors.

With windings 302 and windings 304, there are still gaps between the conductors. Additionally, there is a practical limit on how thin insulators 312 and 322 can be. Reducing the thickness of traditional insulation coatings is impractical with plastic or other dielectrics since they provide both mechanical isolation and electrical isolation. As the motor spins and heats up, the magnetic force will create an equal and opposite force in the opposite direction, which causes the wires to press into each other, and the insulation provides the mechanical isolation of the wires. Many coatings become soft as they heat up. Thus, reducing the thickness of the insulation in windings 302 and 304 can cause mechanical as well as electrical isolation issues.

Figure 3C:
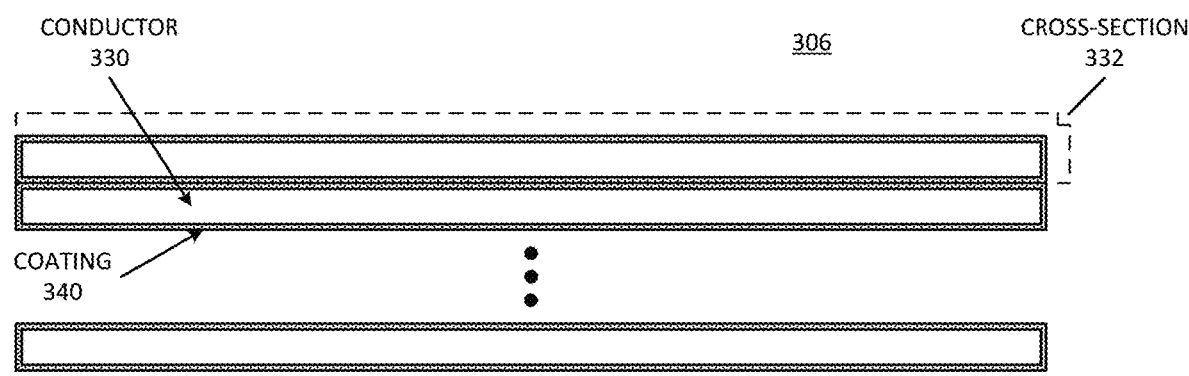
FIG. 3C is a diagram of an embodiment of layers of coated conductor.

FIG. 3C is a diagram of an embodiment of layers of coated conductor. It will be understood that the dimensions of conductors 330 in stator assembly 306 may not necessarily represent actual scale. The scale of elements within assembly 306 may be different with respect to each other than what is shown. Additionally or alternatively, the scale of elements within assembly 306 are not necessarily intended to be to scale with respect to windings 302 and 304 of FIGS. 3A and 3B, respectively.

Assembly 306 includes a stack of conductors 330, which include coating 340. Making a stack of conductors 330 with thin coating 340, more conductor can be put into the available volume as compared to windings that result in gaps between wires. Many commonly used dielectrics are flammable, and will combust at the high temperatures possible in overheating conditions, made worse by the thermal insulating characteristics of these coatings. Making such coatings thinner can increase the risk of failure, both mechanically and electrically. However, coating 340 represents a coating created by bonding material to conductor 330. In one embodiment, coating 340 represents a chemical reaction with conductor 330.

For example, consider that conductor 330 is or includes aluminum, which can be chemically reacted to create an anodized coating. In one embodiment, coating 340 is sapphire (aluminum oxide) over the aluminum conductor. A chemically-reacted or bonded coating is mechanically much stronger, as well as superior in dielectric insulating characteristics to many traditional magnet wire coatings. As another example, diamond coated copper is even better for thermal conduction than sapphire over aluminum, although processing diamond onto copper may require controlling graphite and contaminate content, seeing that contaminates cause the diamond to become somewhat conductive, which degrades its performance as an electrical insulator. Pure diamond is ideal as an insulator. With greater strength, hardness, and dielectric constant, there are obvious advantages over both traditional coatings as well as sapphire coated aluminum. However, both sapphire and diamond coatings can be broken when applied as thin layers. Sapphire can be brittle and will crack when flexed. Diamond coatings may be preferably only a few microns thick, which easily break. However, it will be understood that sapphire coatings can heal with exposure to oxygen, whereas diamond coatings will not. With the ability to control the coating thickness by the electro-chemical or anodizing process, the insulation thickness of coating 340 can be controlled based on the required or planned voltages in the stator layers or windings. Thinner wires have reduced eddy currents generated, but given a required breakdown voltage, the ratio of the coating thickness to conductor area becomes a problem with very thin wires in traditional motor designs. The stacks of conductor 330 can achieve more conductor with thinner coating 340.

As is generally understood, the strength of the induced electromagnetic field is directly proportional to the current, and the power is proportional to the current multiplied by the counter electromotive force (EMF) voltage. Given these proportionalities, the designer can tune a particular motor's performance by either controlling the geometry of conductor 330 or controlling the thickness of coating 340, or controlling both. A designer can control the thickness and shape of conductor 330, and the type and thickness of coating 340.

Conductors 330 have a rectangular cross-section 332. Conductors in wire form, such as the metal wires in windings 302 and 304, are usually fixed in cross section or diameter, and the resistance is based on the amount of material for switching frequencies typically used in motors. Smaller cross sections have greater resistive losses than larger cross sections with the same conductor, at least in the case of aluminum. A wire size is typically chosen to allow a desired number of turns in the winding, to set the voltage and current by the minimum volume and packing requirements. Lowering the total system conductive losses by making some sections larger is possible by taking advantage of the available space or volume.

In one embodiment, increasing the amount of conductor 330 can reduce total resistance with an acceptable weight penalty or material costs. Increasing the amount of conductor 330, such as through the patterning (not shown in FIG. 3C) of the conductor layers, increases machine efficiencies and makes the stator stronger and stiffer. Additional conductor can also allow more options for connecting layers and providing more material as a thermal heat sink for temporary overheating, such as to enable temporarily overdriving a motor. The same techniques of filling the available volume with a conductor formed to minimize eddy current losses, as well as resistive losses can be performed with aluminum, graphene, copper, and other metals and non-metallic conductors.

Assembly 306 does not illustrate the magnets that would be part of a motor assembly. As mentioned above, the stack of conductors 330 can be sandwiched between two layers of magnets (such as what is illustrated in assembly 200), or two layers of conductors 330 can sandwich a magnetic layer. Traditional motors include silicon steel laminations that leverage the increased magnetic permeability of steel or other suitable materials over air. Such silicon steel laminations have several downsides that offset the increased field strength. One tradeoff is hysteresis losses as the fields switch back and forth during motor commutation. As the fields switch back and forth they can saturate, limiting the maximum field that can be produced. Additionally, traditional laminations add weight and occupy volume that could be used for additional conductors.

In one embodiment, the conductor stack of stator assembly 306 is used in a permanent magnet axial flux motor. Use of permanent magnets can enable the elimination of the steel laminations, which will free up volume that can be replaced with more conductors 330. Increasing the amount of conductor 330 to assembly 306 tends to increase the reluctance, and produces additional magnetic force for the same amount of current flowing. In one embodiment, a motor designed with assembly 306 utilizes additional poles, additional magnetic material, additional conductors, increased stator radius, or any combination of these. The increases in number of poles, amount of magnetic material, or radius can produce greater power and torque for a given volume and weight. It will be understood that such increases may require switching speeds relative to less material, and may increase operating voltages and magnetic poles and material.

Since motors and other electromagnetic machines are typically thermally limited devices, a combination of reducing eddy current losses and reducing resistance losses produces motors with greater efficiencies. In one embodiment, coating 340 represents a material that is mechanically stronger than conductor 330. Mechanical strength refers to the ability to withstand the forces produced by operation (spinning and heating) of the motor. In traditional motor design, the insulation is mechanically weaker than the copper or aluminum wire, which creates a need for additional structures to maintain wire placement in the motor. By Newton's Law of Force, the wires and their insulators will be pushed and pulled as the EMFs are applied for advancing the rotor or moving a segment as a series of pulses. Such pushing and pulling creates forces on the insulation than can cause motor burnout. In one embodiment where coating 340 is mechanically stronger than conductor 330, the mechanical nature of the motor is inverted, and the insulation can provide structure for the stator. Thus, instead of requiring additional structure, in one embodiment, stator assembly 306 can become the structure for a frameless motor, or the mechanical system itself. In one embodiment, alternating layers of conductor 330 have alternating edge overlap, where in the event of a failure of an insulating anodized sapphire coating, there is a flat surface in contact with the edge instead of another edge. Such alternations can allow self-healing of the motor, because when exposed to oxygen, an anodized sapphire coating will heal naturally over time. The overlapping of the materials can reduce problems with vibrations as the layers of metal rub against each other.

Motor power is limited thermally when eddy current losses and resistance losses contribute to stator failure. Such losses can also result in mechanical failure by warping, overheating, or loss of lubrication due to excess heat, or a combination. Increasing efficiency by even ten percent from eighty to ninety percent, might not seem significant from the standpoint of total power consumption, but such improved efficiencies can decrease waste heat and required cooling by fifty percent, from twenty percent to ten percent of total power. Thus, even small efficiency improvements can eliminate cooling requirements which have their own power, size, and component costs.

Figure 4A:
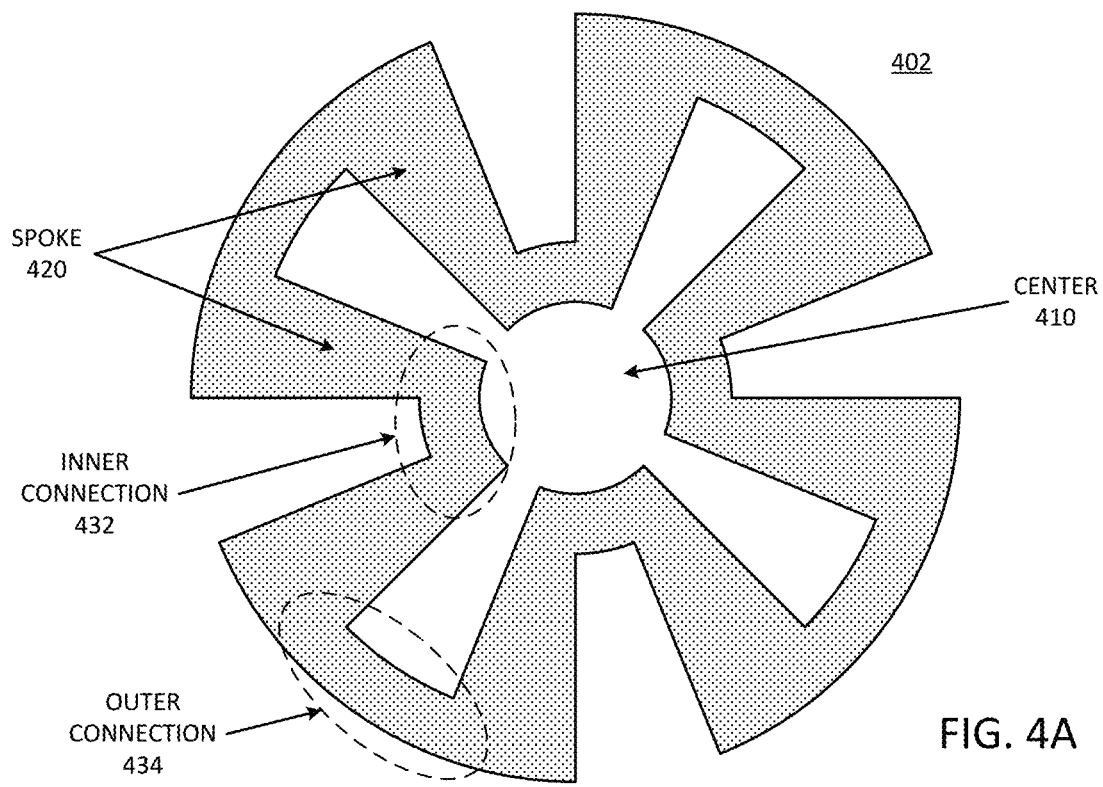
FIG. 4A is a diagram of an embodiment of a conductor coil.
Figure 4B:
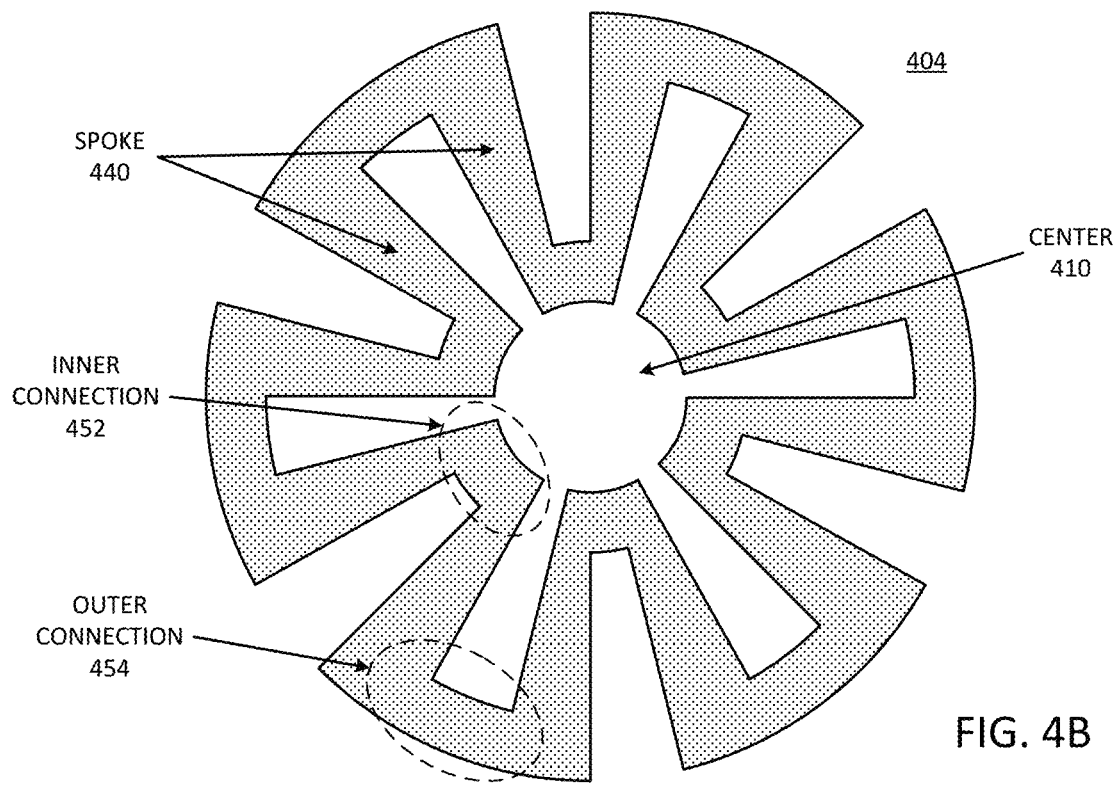
FIG. 4B is a diagram of another embodiment of a conductor coil.

FIGS. 4A-4B are diagrams of embodiments of a conductor coil. Coil 402 of FIG. 4A and coil 404 of FIG. 4B represent a perspective of looking at patterning of an electrical path of a layer of conductor. In one embodiment, coil 402 provides one example of a conductor layer in accordance with conductor 330 of assembly 306 of FIG. 3C. In one embodiment, coil 404 provides one example of a conductor layer in accordance with conductor 330 of assembly 306 of FIG. 3C. Coil 402 illustrates an example of a conductor layer with four segments, and coil 404 illustrates an example of a conductor layer with six segments. Each segment of the conductor layer can be considered a portion of an electrical path from the center of the conductor layer to the outside of the conductor layer back to the center, and includes a spoke to conduct change from the inner edge to the outer edge, and a spoke to conduct charge from the outer edge to the inner edge. Alternatively, the portions could be considered a portion of an electrical path from the outside of the conductor layer to the inside of the conductor layer back to the outside.

Referring to coil 402, the coil includes an electrical path that winds radially around center 410, within a plane of the conductor layer. Coil 402 includes spokes 420 that extend between an inner connection 432 and an outer connection 434. Inner connection 432 is within the conductor layer close to center 410. Outer connection 434 is close to an outer edge of the conductor layer. As illustrated, coil 402 includes alternating outer and inner connections between adjacent spokes 420. The alternating connections provides the coiled electrical path of the conductor layer. Such a path can be considered from one perspective as a "two-dimensional" path as compared to the three dimensional path of a traditional winding, which has turns in all three dimensions, as opposed to have turns constrained within a plane.

Similar to coil 402, referring to coil 404, the coil includes an electrical path that winds radially around center 410, within a plane of the conductor layer. Coil 404 includes spokes 440 that extend between an inner connection 432 and an outer connection 454. Inner connection 452 is within the conductor layer close to center 410. Outer connection 454 is close to an outer edge of the conductor layer. As illustrated, coil 404 includes alternating outer and inner connections between adjacent spokes 440. The alternating connections provides the coiled electrical path of the conductor layer. Such a path can be considered from one perspective as a "two-dimensional" path as compared to the three dimensional path of a traditional winding, which has turns in all three dimensions, as opposed to have turns constrained within a plane.

The physical dimensions of the spokes and connections can be different depending on how many portions or segment of the conductor layer there are. It will be understood that the conductor layers are not limited to four or six portions, but can include any number of portions, including odd numbers of portions. The shape, size, and number of portions can be dependent on the implementation of the motor. Additionally, while a similar shape of the spokes and connection is illustrated for both coils 402 and 404, other shapes can be used. The spokes can be thicker or thinner, as well as the connections. In one embodiment, spokes 420 and 440 are wider as the spoke extends further away from center 410 to the stator edge. Varying the spoke width can increase the amount of conductor that can be packed within a stator assembly. In one embodiment, spokes 420 or spokes 440 or both have a consistent width from the inner connection to the outer connection. Different spoke widths can be observed as a varying cross-section of the conductor layer.

In general regarding the conductor layers, regardless of numbers of portions or size and shape of the spokes, the conductor layers are stacked for a stator assembly. Instead of winding around a steel core as previously done, coils 402 and 404 can wind radially around center 410, and connect to adjacent layers, either in series or in parallel, to provide more electrical path of conductor between layers in the stator assembly.

For purposes of example, consider a discussion with reference to coil 404 created from a layer of aluminum conductor. The discussion will be understood to be able to apply to layers of different conductor and different coatings. In one embodiment, coil 404 is one of multiple layers of aluminum. In one embodiment, coil 404 is created from processing a sheet of aluminum. Such processes aluminum can be created as a rectangular component that is adjusted to coil radially. In one embodiment, coil 404 is created by one or more of stamping or cutting the conductor. The processed conductor is treated to create an electrically conductive pathway with an insulator coating. In one embodiment, multiple layers are joined to create an inductor, and then processed to create the coating. In one embodiment, multiple layers are created and processed to create the coating, and then joined in layers. The inductors or coils can be formed into a stator, which can improve the amount of conductor in the volume, while reducing the amount of insulation required and the losses from eddy currents and bulk resistance.

Varying the order of joining, cutting, and stamping to optimize a particular characteristic can be made depending on the application for linear, rotary, or fixed couplings of magnetic fields for electromagnetic machines. Putting the conductors in varying configurations of series and parallel and varying the dimensions, number of layers, or complexity of the current path allows tuning of the machine to desired performance, efficiency, voltage, and maximum current carrying capabilities. In one embodiment, spokes 440 and inner and outer connections 452 and 454 can be formed through cutting aluminum by laser, plasma, water jet, stamping, or other process, or a combination. In one embodiment, spokes 440 can be further processed by cutting radius lines, or lines that extend along a radius of a circle with a center at center 410, and extend between inner connection 452 and outer connection 454. Such cutting can also be accomplished with laser, water jet, stamping, or other process, or a combination. Other drawings discussed below more explicitly illustrate such radius lines to create segments in the current path of the spoke.

Separating the spokes into multiple parallel segments limits the current path in one direction while only reducing the current path in the other dimension by the volume lost by the insulating layer and removed material. With multiple parallel current paths for at least a portion of the conductor coil, the performance can be tuned by selecting a configuration that provides the greatest current carrying capabilities while reducing eddy current and bulk resistance losses. In one embodiment, the portion of the conductor layer that has parallel paths is limited to a portion proximate where the conductor layer will pass by the magnets of the magnetic layers. In accordance with what is illustrated by coil 404, in one embodiment, the design can connect layers of desired thicknesses by joining them at the inner circumference, the outer circumference, or with alternating joints. Alternating the positions of cuts and edges as the layers overlap can prevent localized rubbing failure and heating if the conductor layers or plates are not fixed, and wear occurs due to motion.

In one embodiment, coil 404 replaces traditional insulation on the stator with anodized aluminum, which is a form of aluminum oxide also known as sapphire, achieves multiple advantages. Anodizing techniques can convert the surface of a layer of aluminum conductor into aluminum oxide or sapphire, which is a coating that is hard, strong, resistant to chemical attack, highly electrically insulating, and yet has good thermal conducting characteristics. As such, coil 404 can be used to create a stator with properties in terms of efficiency, durability, strength, and capabilities that are improved relative to traditional wound motors.

The anodizing creates sapphire, which even as a microscopic sponge-like material with holes, fingers, gaps, cracks, and varying thickness, has better dielectric or insulation characteristics than traditional wire insulators. Additionally, sapphire is much harder and tougher as compared to polyimides, plastic, enamel, paper, and other common wire coatings, and has approximately 100 times better thermal conductivity. The dielectric constant of sapphire is greater than 10 kilovolts per millimeter, or >10 kV/mm. The volume resistivity of sapphire is greater than 10 exp 14 ohm*cm. Thus, the volume resistivity of sapphire is approximately the same as silicon, but with a thermal conductivity of 30 W/mK versus a silicone rubber insulator with a thermal conductivity of 0.3 W/mK. The 100 times better thermal conductivity improves heat transfer, which reduces the risk of overheating the motor.

With modern manufacturing techniques, sapphire coated aluminum is relatively inexpensive, and naturally oxidizes or heals in the presence of oxygen to create a self-repairing mechanism. In one embodiment, the aluminum can be anodized to convert the surface of the conductive aluminum into aluminum oxide or sapphire. Sapphire coating is hard, strong, resistant to chemical attack, highly electrically insulating, and provides good thermal conducting characteristics. A coil or stator constructed from stacks of sapphire coated aluminum can provide a motor with higher efficiency, durability, strength, and over-driving capability as compared to traditional motors.

It will be understood that bending the conductor after it has been anodized to produce the sapphire coating will cause cracking. Thus, sapphire coated wire for use in traditional windings would not be possible. However, by stacking planar conductor layers, the cracking of the sapphire coating can be minimized, or effects from such cracking can be reduced. For example, such cracking may be limited to an area where the layers are meant to be connected, and so a short in the connecting portion has little to no meaningful impact on the performance of the stator. A thin aluminum oxide coating has a higher melting temperature than aluminum itself, making it difficult to burn out a motor that uses a stator of sapphire coated aluminum conductor. Traditional failures where the dielectric, insulator, or plastic heats up and fails producing shorts are reduced or even eliminated, making a motor inn accordance with what is described herein more robust than traditional motors.

Figure 5:
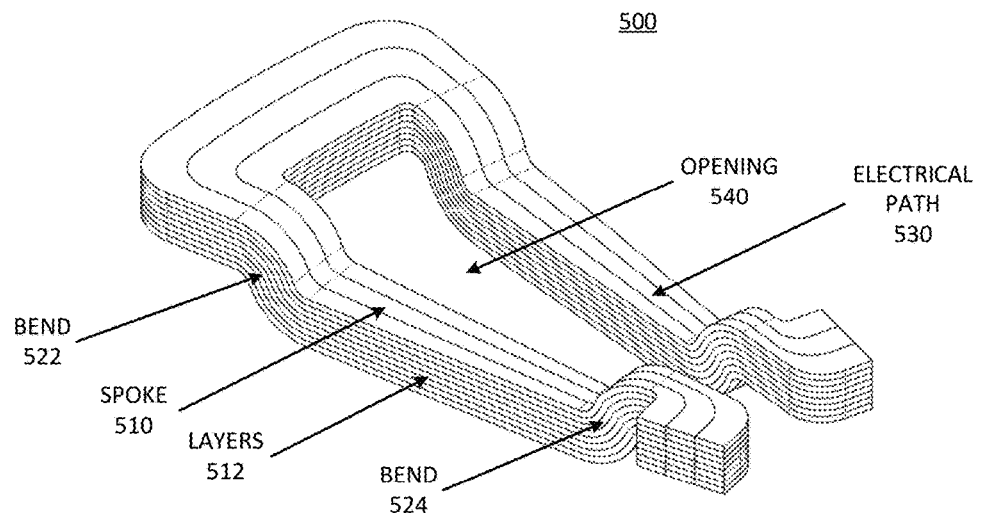
FIG. 5 is a diagram of an embodiment of a conductor path with folding and bending.

FIG. 5 is a diagram of an embodiment of a conductor path with folding and bending. Assembly 500 provides an example of a segment of stacked coated conductors in accordance with an embodiment of coils 402 or 404. The segment illustrated in assembly 500 includes spoke 510. Spoke 510 represents a stack of spokes of different layers 512 of conductors. Each spoke 510 provides an electrical path 530 for current. With coated layers 512, the various electrical paths 530 can be separate for each layer. The layers can be connected variously in parallel or series or a combination to provide different combinations of current capacity or different voltages.

Opening 540 represents a space between two spokes 510. In one embodiment, assembly 500 includes opening 540, which can provide space to nest with one or more other layers of conductors. In one embodiment, assembly 500 includes bends 522 and 524 to enable the nesting of multiple stacks of layers of conductors. In one embodiment, assembly 500 is nested with at least one stack of conductor layers that has no bends. In one embodiment, assembly 500 is nested with at least one stack of conductor layers that also has bends. In one embodiment, where stacks of layers are nested, the bending changes the electrical path length of one stack as compared to another. Electronics can control the duty cycle of driving the different paths to account for the variations in electrical path length for different stacks.

In one embodiment, assembly 500 is created with folding of electrical path 530 to provide the radial current path that provides field to drive the electromagnet motive force, and then the return path. The folding refers to the serpentine shape that results from various elements in accordance with assembly 500 coupled together to form a complete radial path (e.g., 360 degrees of folded path). The shape provided by the folding reduces the total path length verses two coils with a complete circular path.

Figure 6A:
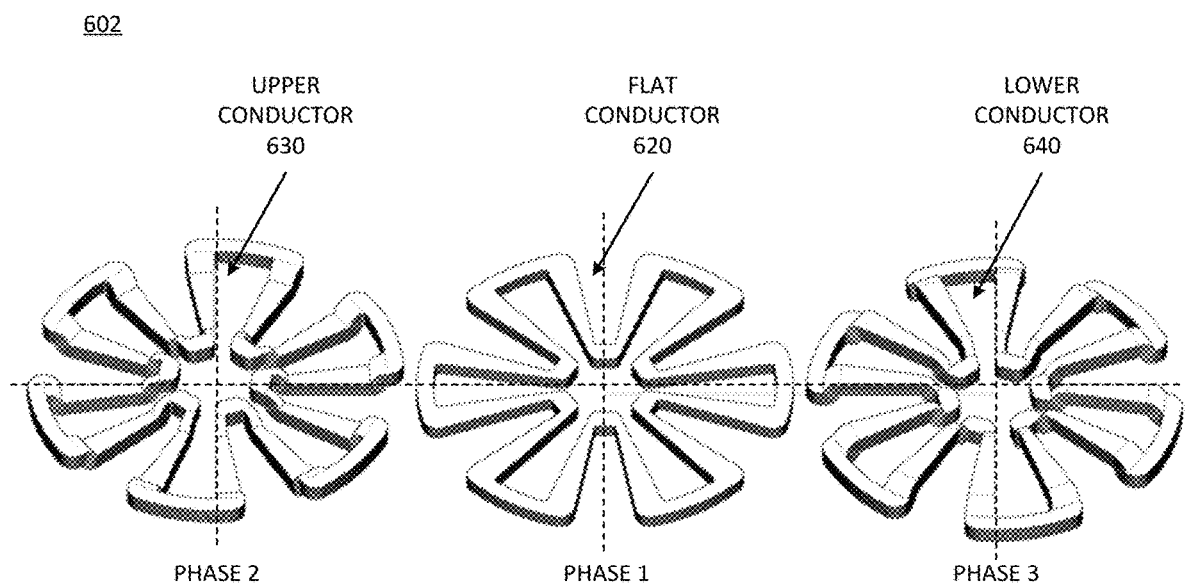
FIG. 6A is a diagram of an embodiment of a conductor sheets with three phases.

FIG. 6A is a diagram of an embodiment of a coated conductor sheets with three phases. Diagram 602 illustrates three phases designed to be physically interwoven to produce low voltage and high eddy current. In one embodiment, flat conductor 620, which can also be referred to as a flat coil, is designated as Phase 1. The phase designation is arbitrary, and the system can be designed with different phases for different nested coils.

Diagram 602 illustrates upper conductor 630 or an upper coil, which is designated as Phase 2. Diagram 602 illustrates lower conductor 640 or a lower coil, which is designated as Phase 3. Again, the labels of the phases is arbitrary, and is shown for purposes of illustration only. Additionally, designation of conductor 630 as an "upper" coil and conductor 640 as a "lower" coil is an arbitrary designation based on the specific orientation of diagram 602. In one embodiment, a motor with a three phase stator in accordance with diagram 602 can be mounted and used with the plane of conductors 620, 630, and 640 parallel with the ground, or perpendicular to the ground, or at any arbitrary angle with respect to the ground.

Diagram 602 includes crosshairs over each of conductors 620, 630, and 640, which demonstrates relative positions to each other for nesting. For example, taking flat conductor 620 as a "middle" conductor, the crosshairs align over the center point of the conductor. For upper conductor 630, the conductor is shown slightly offset above the center point of the crosshairs, and for lower conductor 640, the conductor is shown slightly offset below the center point of the crosshairs. It will be observed relative to the crosshairs how the crosshairs align on one edge of a spoke on upper conductor 630, which aligns with a complementary edge of a spoke of lower conductor 640, while the crosshair splits the middle between two spokes of flat conductor 620. It will be understood how the conductors can nest together, and with the bends in the upper and lower conductors, there will be a relatively flat stator core surface made up of alternating spokes of the three different phase stacks. The flat stator core is made up of roughly coplanar stacks interleaved with each other to position spokes of different stacks adjacent to each other. It will be understood that the path length of flat conductor 620 is actually shorter than the two bent or contoured coils of conductors 630 and 640. Traditionally such uneven path lengths would produce uneven force. In one embodiment, a solid state controller (e.g., digital microcontroller or microprocessor) drives the stator assembly of diagram 602 to compensate digitally for the uneven path lengths. The digital compensation enables lower cost mechanical systems in exchange for more complex control software.

Thus, as illustrated, in one embodiment a stator assembly includes a multiple stacks of multiple layers each. Each stack includes multiple layers of coated conductor coils, which can be electrically connected in accordance with any embodiment described herein. In one embodiment, some or all layers of a single conductor stack are connected in parallel to lower a required voltage to drive the EMF. In one embodiment, some or all layers of a single conductor stack are coupled in series to increase the required voltage. In one embodiment, the stacks include two or more coils in a serpentine shape where the coils fold over each other, to form a structure for the stator. It will be understood that the nesting of layers inside each other can increase the total amount of conductor per volume. Nesting the layers can additionally minimize the wearing and potential shorting of adjacent layers.

FIG. 6B is a diagram of an embodiment of a cross section view of the stacking of the three phases of conductors into a stator assembly. Diagram 604 illustrates a cross section of the stator assembly of diagram 602 of FIG. 6A, with the different stacks of conductors aligned with respect to their center points.

The perspective of diagram 604 more clearly indicates the curvature of upper conductor 630 and lower conductor 640, while the stack of conductor 620 is flat. Interleaving such stacks of layers of conductor can almost completely fill the gaps in the stator core, which provides a maximum amount of conductor in a given volume to place adjacent a magnet array. Increasing the amount of conductor in the given volume can reduce the resistive losses. In one embodiment, each phase includes a stack of layers of thin sheets of aluminum or other conductor material which lowers the eddy current losses by the square of the thickness of the plate verses a solid coil of the same shape. The thin sheet can decrease eddy current losses while increasing the voltage required to drive the current.

FIG. 6C is a diagram of an embodiment of a perspective view of the stacking of the three phases of conductors into a stator assembly. Diagram 606 illustrates another perspective of interleaving stacks of conductor. While illustrated as Phase 1, Phase 2, and Phase 3, in one embodiment, the stacked assembly can include a single phase, two phases, or three phases, depending on how the conductors are connected. Because there are multiple layers of conductor in each stack, in one embodiment, the stator assembly of diagram 606 can accommodate more than three phases. Increasing the number of phases decreases the angular rotation between maximum torque, and reduces the current carrying capabilities by requiring narrower conductors.

Figure 7:
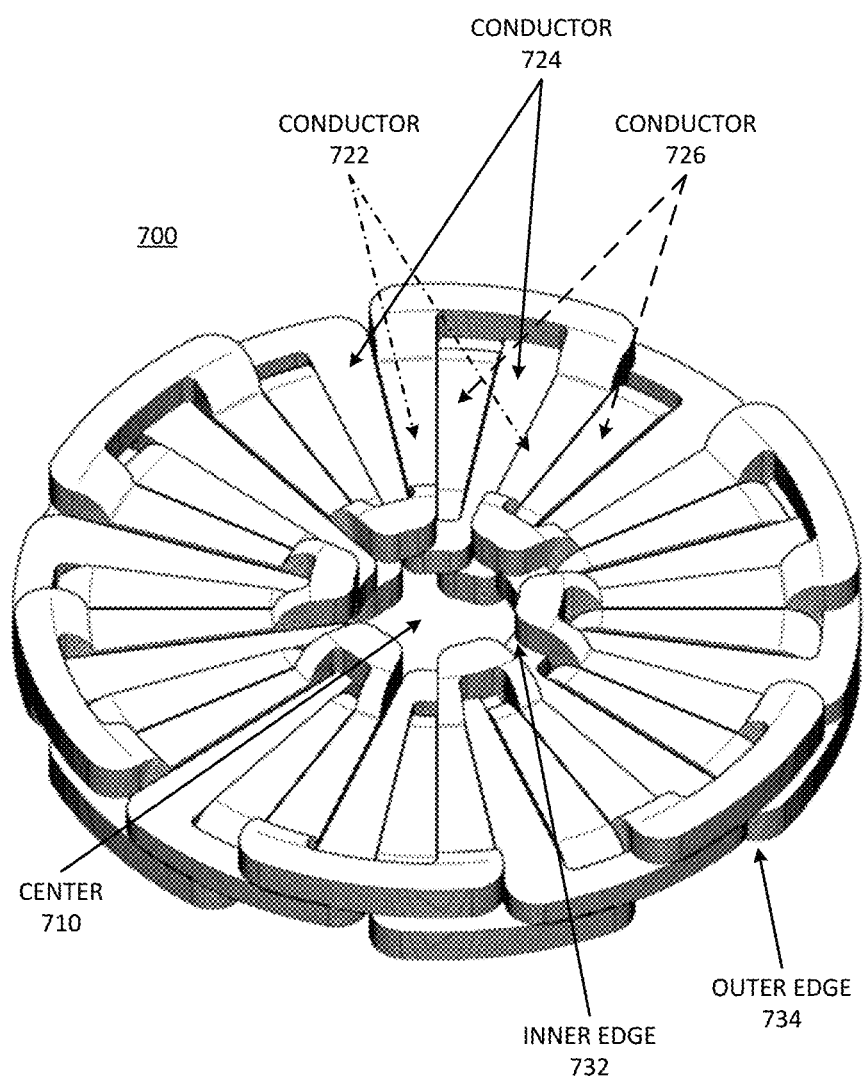
FIG. 7 is a diagram of an embodiment of an assembly of a three phase stator.

FIG. 7 is a diagram of an embodiment of an assembly of a three phase stator core. Assembly 700 provides one example of a stator assembly in accordance with diagrams 602, 604, and 606 of FIGS. 6A, 6B, and 6C. Assembly 700 can provide one example of a 3-phase system. Assembly 700 includes nested conductors 722, 724, and 726. Each reference number in the drawing includes arrows pointing to closest spokes of the same conductor coil, which are separated by spokes of interleaved conductor coils. Thus, for example, assembly 700 includes, moving from left to right, a spoke of conductor 724, adjacent a spoke of conductor 722, adjacent a spoke of conductor 726, adjacent a spoke of conductor 724, and repeating the pattern.

Assembly 700 includes radial current paths provided by conductors 722, 724, and 726. The radial current paths allow current to flow radially with respect to center 710, which provides an interface with an axle. Inner edge 732 is proximate center 710, and outer edge 734 is at a point of the conductors farthest from center 710. It will be observed that each spoke varies in cross sectional area going from inner edge 732 to outer edge 734, which increases the amount of conductor material that can be included in the stator.

In one embodiment, assembly 700 includes a flat radial section to allow a small gap between an axial flux magnetic array. The flat radial section includes the surface of the spoke of coated conductors between inner edge 732 and outer edge 734. The flat radial section can provide a relatively large surface area for cooling. The design of assembly 700 also reduces the amount of material outside the magnetic field while still maintaining a path for the current.

FIG. 8A is a diagram of an embodiment of a conductor separated into multiple segments to reduce current loops. As previously mentioned, the use of thin coated conductor sheets can reduce eddy current losses as compared to thicker conductor. Conductors in wire form are usually fixed in cross section or diameter, and the resistance is based on the amount of material for switching frequencies typically used in motors. Smaller cross sections have greater resistive losses than larger cross sections with the same conductor. However, larger cross sections can result in less efficient packing and fewer windings. Traditionally for a motor design, the wire is chosen to allow a desired number of turns setting the voltage and current by the minimum volume and packing requirements.

A stator in accordance with conductor stack 810 can lower the total system conductive losses by making some sections of the conductor larger to take advantage of the available space or volume, as opposed to a consistent cross section as with a traditional wire. In one embodiment, conductor stack 810 includes multiple layers of aluminum anodized with aluminum oxide. By patterning the conductors, current path 812 can include sections of larger cross section to reduce the total resistance by additional aluminum with only a slight weight penalty or material cost. The additional conductor material increases the machine efficiencies of the motor, and makes the stator stronger and stiffer. The increased amount of conductor can also allow more options for connecting layers and providing more material as a thermal heat sink for temporary overheating.

To create the required EMF to turn a rotor with a magnetic array, the system supplies a current through the conductor, and varies it as a magnetic field from another conductor or magnet moves. However, it will be understood that the movement of the relative magnetic fields produces a field opposing that motion, as described by Lenz's law. Conductor stack 810 illustrates induced eddy currents 814 from a magnet with a magnetic field oriented perpendicular to the direction of motion moving near conductor 810. The letter 'B' with the arrows represents a direction of magnetic flux due to a magnet assembly. The magnet assembly with the magnetic field B moving over a stator that includes current path 812 induces eddy currents 814 as current loops opposing the motion.

Eddy currents 814 produced in conductor 810 circulate, creating a field that must be overcome, which creates a source of losses. These losses can be decreased by making the path smaller, and putting several conductors in parallel to cause the current loops to cancel each other out. However, in a traditional system the use of parallel conductors introduces penalties from additional mechanical complexity, additional insulation, and increased resistive losses as the additional insulation decreases the available conductor. As illustrated, conductor stack 810 segments the conductor into relatively thin layers. The separation into layers can create more current paths 812 relative to a solid conductor of the same volume. The layers of conductor provide parallel paths, and the coating on the conductor provides insulation while not adding significant insulation volume.

In one embodiment, conductor stack 810 includes aluminum or copper or other metal conductor. In one embodiment, conductor stack 810 includes graphene or other non-metallic conductor. Whether metal or non-metal conductor, conductor stack 810 can improve the filling of available volume with a conductor that can minimize eddy current losses as well as resistive losses.

FIG. 8B is a diagram of an embodiment of eddy current in a conductor with a segmented current path. Conductor 820 represents a conductor with cross-section 822, in which eddy current 824 is induced. Conductor 830 represents the same conductor 820 broken up into four segments, having smaller cross-sections 832. Eddy currents 834 are smaller current loops than eddy current 824, which reduces the eddy current losses. It will be understood that eddy current losses drop in proportion to the square of the reduction in cross sectional area. Thus, cutting the width or cross sectional area in half cuts the eddy current losses by 4, cutting the cross section in third cuts the eddy current losses by 9, and so forth.

Applying the principle of reducing the surface area exposed to the magnetic flux to reduce the eddy currents, conductor stack 840 illustrates a similar conductor stack to conductor stack 810 of FIG. 8A, but with segmented current paths 842. Current paths 842 are narrower than current path 812 of conductor stack 810. In one embodiment, current paths 842 are formed utilizing laser cutting, water jet, metal stamping, inductive welding, or other manufacturing techniques, or a combination to create layers of coil that has low resistance for current flow in the desired direction, but high impedance to current in undesired directions. Thus, current path 842 can maximize current carrying capabilities, while at the same time lowering the eddy current losses of eddy currents 844 that result from the relative motions of the magnetic fields.

In one embodiment, conductor stack 840 includes multiple layers of aluminum or other conductor, which is processed by stamping or cutting, or a combination, and joining into the stack, and treated to create an insulated stack of electrically conductive pathway as an inductor which for a stator. The order of stamping, cutting, joining, and treating to form the insulator can be varied. Varying the order of joining, cutting, and stamping can optimize a particular characteristic of current path 842, which can improve its suitability for an application of linear, rotary, or fixed couplings of magnetic fields for electromagnetic machines. The coated conductor maximizes the amount of conductor in the volume while minimizing the amount of insulation required. Conductor stack 840 can include varying configurations of series and parallel conductors, which can include varying dimensions, number of layers, varying shape or complexity of the current path, or a combination. It will be understood that the variations can allow the tuning of a machine to a desired combination of capabilities such as performance, efficiency, voltage, or maximum current carrying capability.

In one embodiment, conductor stack 840 includes multiple current path 842 in the same conductor plane, which are not electrically connected to each other. In one embodiment, conductor stack 840 includes multiple current paths 842 that are separated only along a path of the conductor where a magnetic array will pass over, and can be connected at the outer circumference, inner circumference, or both (for example, compare FIG. 9A to FIG. 9B). Making many thin plates with long cuts to separate current paths 842 decreases eddy currents 844. Conductor stack 840 can include multiple thin conductors with parallel current paths 842 joined electrically perpendicular to the direction of motion, but electrically isolated in the direction of motion.

In one embodiment, the various layers of conductor stack 840 can be connected at the inner circumference. In one embodiment, the various layers of conductor stack 840 can be connected at the outer circumference. In one embodiment, the various layers of conductor stack 840 can be connected at with alternating joints at inner and outer circumferences. In one embodiment, alternating layers of conductor stack 840 have different positions of the cuts and the edges as the layers overlap. Such variation can prevent localized rubbing failure and heating if the plates are not fixed, causing wear to occur due to motion. For example, consider current paths 842, showing three separate paths in a single conductor layer. If the next conductor layer had two separate paths, the one cut of that layer would not overlap with the two cuts of the illustrated layer, which could increase the electrical separation of the layers. Other variations will be understood in accordance with what is described.

Figure 9A:
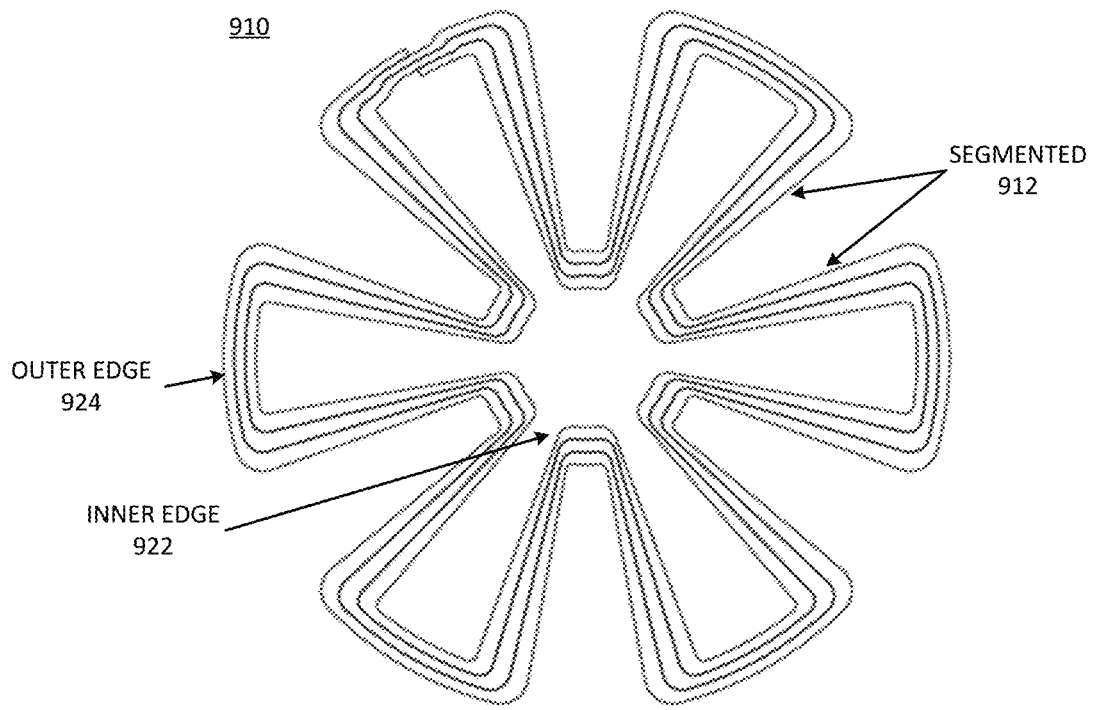
FIG. 9A is a diagram of an embodiment of a top view of a conductor with a segmented current path.

FIG. 9A is a diagram of an embodiment of a top view of a conductor with a segmented current path. Conductor layer 910 illustrates a flat stator layer with partial or full separation between the current loops. Conductor layer 910 includes segmented spokes 912, but with radial current paths due to the conductor completing the path all the way around the conductor layer, the conductor allows the current to flow along the desired direction. In one embodiment, the segmentation occurs at inner edge 922 and at outer edge 924. In one embodiment, inner edge 922 and the spokes are segmented and outer edge 924 is not segmented. In one embodiment, only outer edge 924 and the spokes are segmented and inner edge 922 is not segmented. As illustrated, conductor layer 910 includes spokes with multiple parallel current paths aligned orthogonal to a motion of magnetic poles of a magnet assembly. In accordance with what is described above with reference to FIG. 8B, conductor layer 910 can be layered in a stack with other layers having the same or different patterning. In one embodiment, alternating layers have segmented spokes, and one or more layers do not have segmented spokes, or have fewer segments. More than three segments are possible.

Figure 9B:
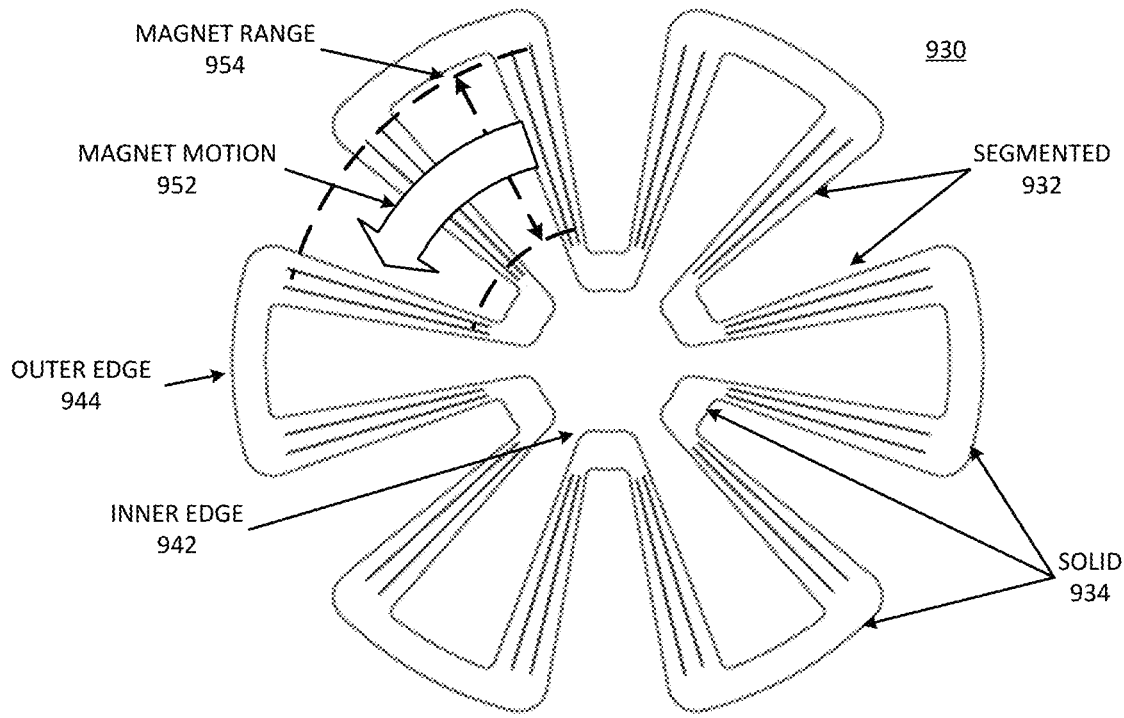
FIG. 9B is a diagram of an embodiment of a top view of a conductor with a partially segmented current path.

FIG. 9B is a diagram of an embodiment of a top view of a conductor with a partially segmented current path. Conductor layer 930 illustrates a flat stator layer with partially segmented conductor portions. More specifically, conductor 930 includes segmented spokes 932 with inner edge 942 and outer edge 944 that are not segmented. Thus, conductor 930 includes segmented current path portions 932 and solid current path portions 934 in the radial current path of the conductor layer. The segmenting of the spokes provides separation between eddy current loops due to the fact that eddy currents are induced in the spokes based on magnet motion 952. Magnet range 954 represents an approximate range of where the magnet elements of the magnet assembly will pass over conductor layer 930. In one embodiment, segmented portions 932 extend radially for approximately the same length as a width of magnet range 954. Radial cuts or separations reduce the eddy currents by the square of the subdivision. In one embodiment, the center of the path represented by inner edge 942 and the end path represented by outer edge 944 are outside the main field, and are therefore less affected by eddy current. With the portions of the path that are outside the main magnetic field are left solid, conductor layer 930 can improve mechanical stiffness as compared to a completely segmented conductor layer, if the circulating currents are below the desired eddy current losses.

Figure 10A:
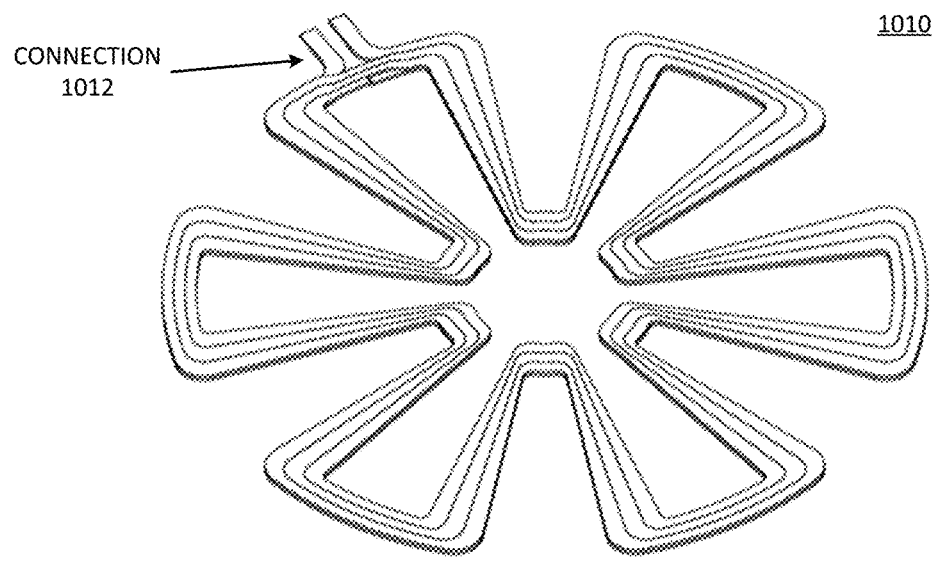
FIG. 10A is a diagram of an embodiment of a serpentine winding with layers joined at the outer circumference.

FIG. 10A is a diagram of an embodiment of a serpentine winding with layers joined at the outer circumference. Conductor 1010 provides an example of a layer of coated conductor to be in a stack of conductor in accordance with any embodiment described herein. Conductor 1010 is a serpentine winding with six segments, which reduces the conducting path as compared to six traditional coils, while giving a mechanical path to allow additional conductors to be overlapping. The overlapping or interleaving of conductors can provide for increased volumetric density, while allowing for either one phase or two or more phases. In one embodiment, conductor 1010 connects to other layers in a stack at connection 1012 on the outer circumference. In one embodiment, connection 1012 enables multiple conductor coils to be formed from a same plane of conductor material (e.g., stamped from the same sheet metal), and then bent or folded over each other. Thus, multiple layers can be formed joined at connection 1012, and then folded or bent to form a stack of conductor. Depending on how connection 1012 is connected to the current paths of conductor 1010, and to how it is connected to other layers, connection 1012 can provide a parallel connection for adjacent layers, or can provide a series connection for adjacent layers. In one embodiment, an outer circumference connection 1012 can allow the inner circumference to be free floating, allowing a stator to spin relative to a shaft that passes through the center of conductor 1010 (not shown).

Figure 10B:
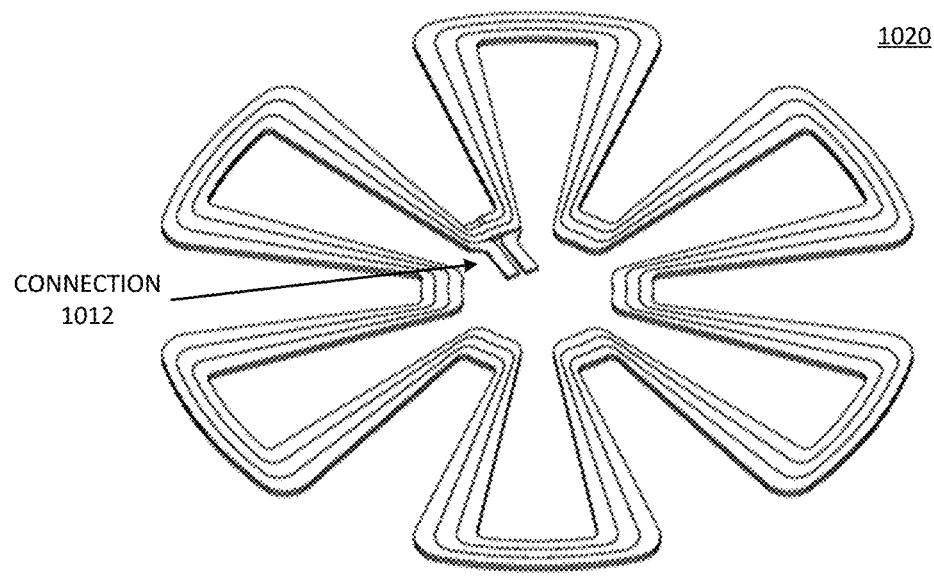
FIG. 10B is a diagram of an embodiment of a serpentine winding with layers joined at the inner circumference.

FIG. 10B is a diagram of an embodiment of a serpentine winding with layers joined at the inner circumference. Conductor 1020 provides an example of a layer of coated conductor to be in a stack of conductor in accordance with any embodiment described herein. Conductor 1020 is a serpentine winding with six segments, which reduces the conducting path as compared to six traditional coils, while giving a mechanical path to allow additional conductors to be overlapping. The overlapping or interleaving of conductors can provide for increased volumetric density, while allowing for either one phase or two or more phases. In one embodiment, conductor 1020 connects to other layers in a stack at connection 1022 on the inner circumference. In one embodiment, connection 1022 enables multiple conductor coils to be formed from a same plane of conductor material (e.g., stamped from the same sheet metal), and then bent or folded over each other. Thus, multiple layers can be formed joined at connection 1022, and then folded or bent to form a stack of conductor. Depending on how connection 1022 is connected to the current paths of conductor 1020, and to how it is connected to other layers, connection 1022 can provide a parallel connection for adjacent layers, or can provide a series connection for adjacent layers.

In one embodiment, an inner circumference connection 1022 can allow the outer circumference to be free floating, allowing a stator to be connected to a shaft in the center (not shown), and the entire assembly to float relative to a housing (not shown) outside the outer circumference. For in wheel motors and other devices which are fixed to a shaft, conductor 1020 allows the outer circumference to be free standing.

Figure 11A:
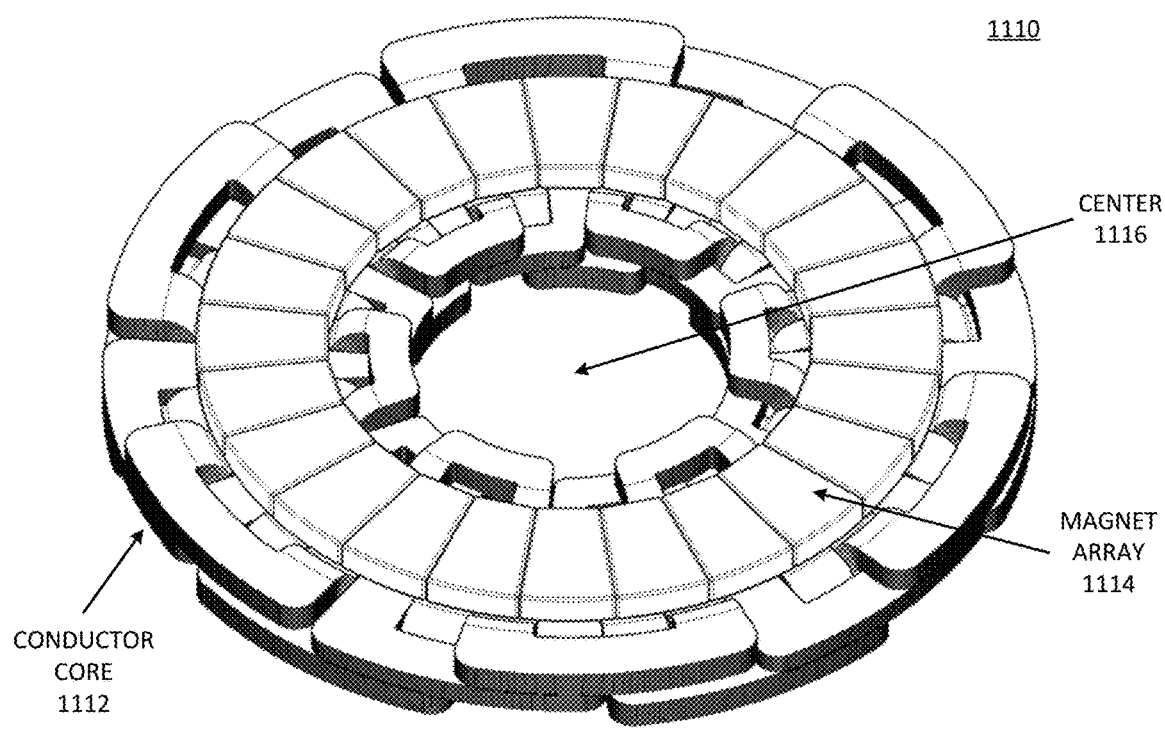
FIG. 11A is a diagram of an embodiment of a Halbach array arrangement over the flat phase of a coil assembly.

FIG. 11A is a diagram of an embodiment of a Halbach array arrangement over the flat phase of a coil assembly. Assembly 1110 illustrates a Halbach array over an interleaved coil assembly or conductor assembly. Assembly 1110 includes conductor core 1112, which can include stacks of coated conductor layers in accordance with any embodiment described herein. Assembly 1110 includes magnet array 1114 in a Halbach arrangement. While not specifically seen, a dual axial Halbach array also includes a magnet array on the other side of conductor core 1112. In one embodiment, assembly 1110 includes one magnet array 1114 adjacent conductor core 1112. In one embodiment, assembly 1110 includes two magnet arrays 1124 adjacent conductor core 1112, with conductor core 1112 between the two magnet arrays.

Conductor core 1112 has conductor around center 1116. Magnet array 1114 is also in a circular pattern around center 1116. Center 1116 can allow for the inclusion of a shaft or rotor. In one embodiment, conductor core 1112 provides a stator core for an electric motor. In one embodiment, magnet array 1114 is separate from conductor core 1112 by a small air gap. Magnet array 1114 can be considered adjacent conductor core 1112 even when separated by an air gap. For example, magnet array 1114 can be secured in the illustrated arrangement by mounting in a housing that covers conductor core 1112. In one embodiment, magnet array 1114 includes magnets that are not rectangular, but are shaped to fill the space around the circle of assembly 1110.

Figure 11B:
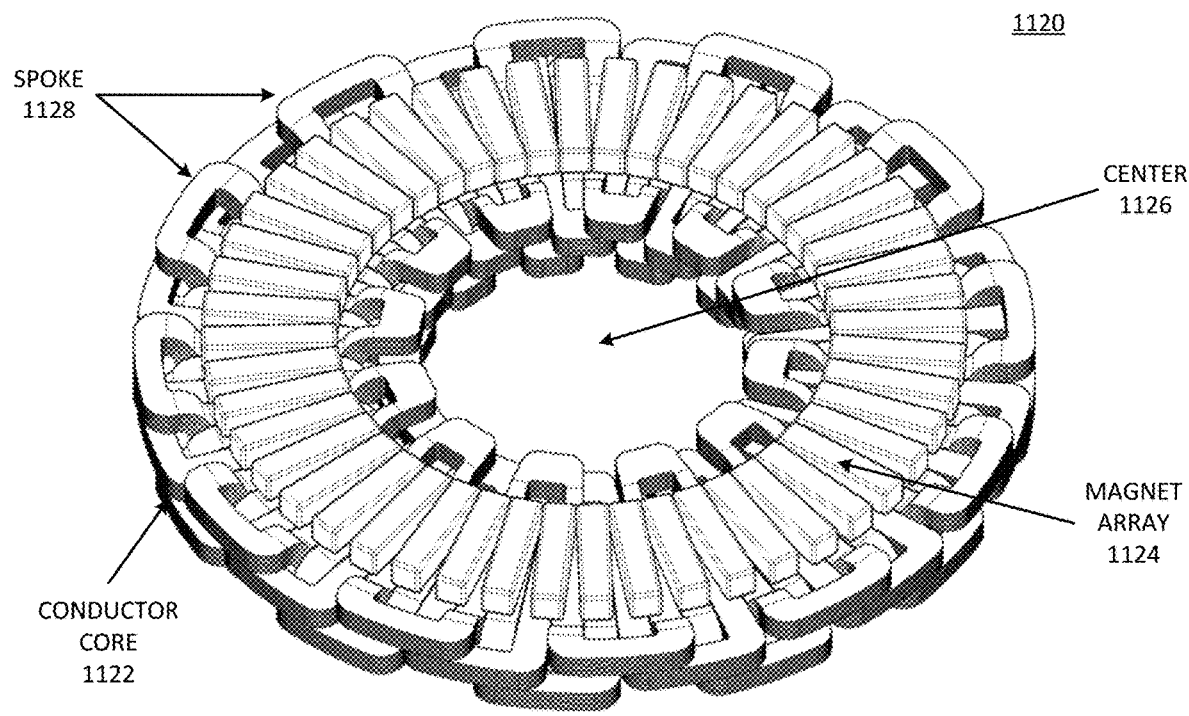
FIG. 11B is a diagram of an embodiment of a dual axial Halbach array.

FIG. 11B is a diagram of an embodiment of a dual axial Halbach array. Assembly 1120 illustrates a Halbach array over an interleaved coil assembly or conductor assembly. Assembly 1120 includes conductor core 1122, which can include stacks of coated conductor layers with multiple spokes 1128 in accordance with any embodiment described herein. Assembly 1120 includes magnet array 1124 in a Halbach arrangement. While not specifically seen, a dual axial Halbach array also includes a magnet array on the other side of conductor core 1122. In one embodiment, assembly 1120 includes one magnet array 1124 adjacent conductor core 1122. In one embodiment, assembly 1120 includes two magnet arrays 1124 adjacent conductor core 1122, with conductor core 1122 between the two magnet arrays.

Conductor core 1122 has conductor around center 1126. Magnet array 1124 is also in a circular pattern around center 1126. Center 1126 can allow for the inclusion of a shaft or rotor. In one embodiment, conductor core 1122 provides a stator core for an electric motor. In one embodiment, magnet array 1124 is separate from conductor core 1122 by a small air gap. Magnet array 1124 can be considered adjacent conductor core 1122 even when separated by an air gap. For example, magnet array 1124 can be secured in the illustrated arrangement by mounting in a housing that covers conductor core 1122. In one embodiment, magnet array 1124 includes rectangular magnets, which leaves small gaps between the magnets around the circle of assembly 1120. Assembly 1120 illustrates more magnets as compared to assembly 1110, providing more magnetic poles. It will be understood that assembly 1110 can include more magnets, and assembly 1120 can include fewer. Thus, the shape of the magnets is not necessarily related to the number of magnets in the array. More magnetic poles produces or requires higher frequency in operation as a motor or generator relative to fewer magnetic poles.

With reference to both FIG. 11A and to FIG. 11B, the structure of assembly 1110 and 1120 can provide for cooling. With the spiral motion of the stator assemblies, air or fluid will move from the center outward due to centripetal force. As the rotational surface accelerates, the air or fluid produces tangential motion, causing a net heat transfer outward radially. With the heat transfer capabilities of sapphire or another coating, the coating can transfer heat away from conductor, and then the cooling spiral motion removes the heat away from the assembly. With an air gap between the conductor layers and the magnet assemblies, air or another fluid can pass between the conductors and the magnets. Thus, the structure and motion used for the operation of the motor can provide needed cooling. Forming one or more phases of the inductor into an almost solid stator provides a rigid structure that can dissipate heat with the centripetal flow of cooling fluid or gas that enters from the center around the axis of rotation. As heat transfers to the surface of the conductor with a coating, the fluid or gas can carry the heat from the surface of the rotor, spiraling out to remove heat from the stator. Using modern motor controllers with digital control allows modification of the current and voltage characteristics to vary the speed, torque, and power requirements digitally. In one embodiment with multiple phases, the digital control can digitally make each phase appear to be identical electrically and physically, even when the different phases have different physical structures and different electrical path lengths.

Figure 12B:
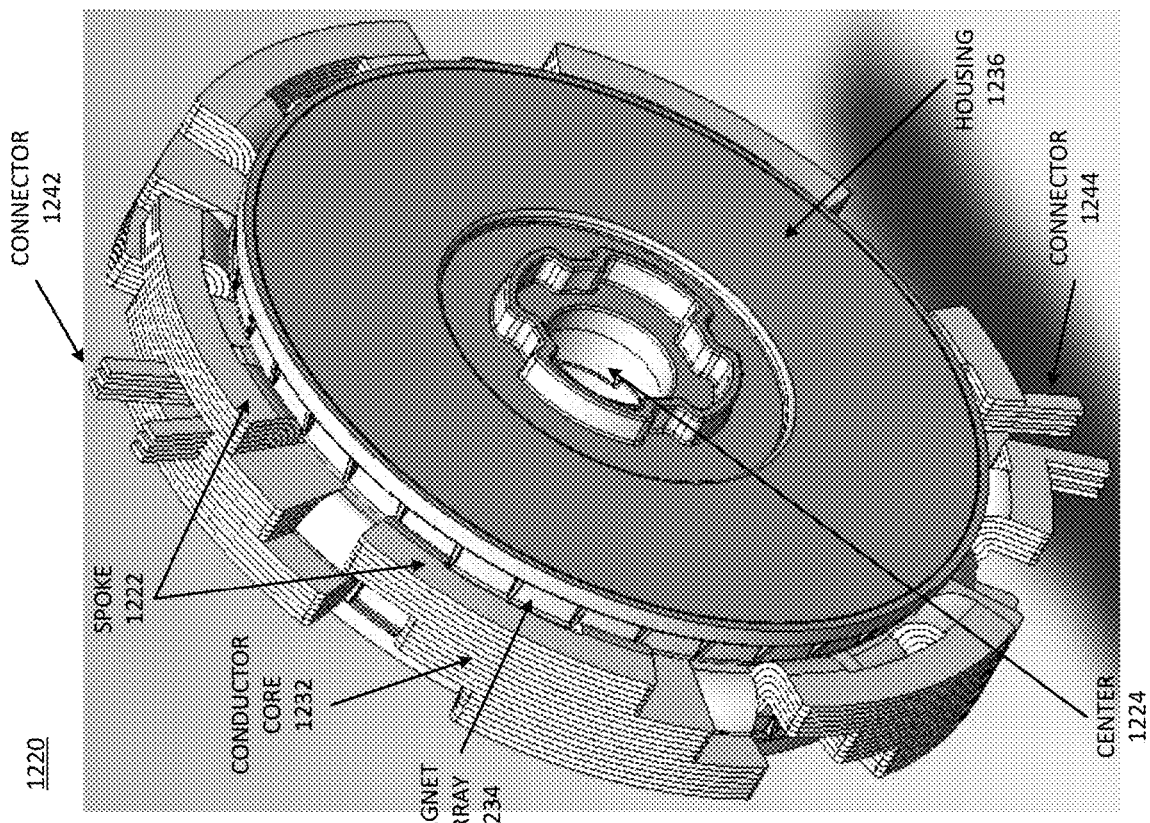
FIG. 12B is a diagram of an embodiment of a motor assembly with layers of conductors and a housing.
Figure 12A:
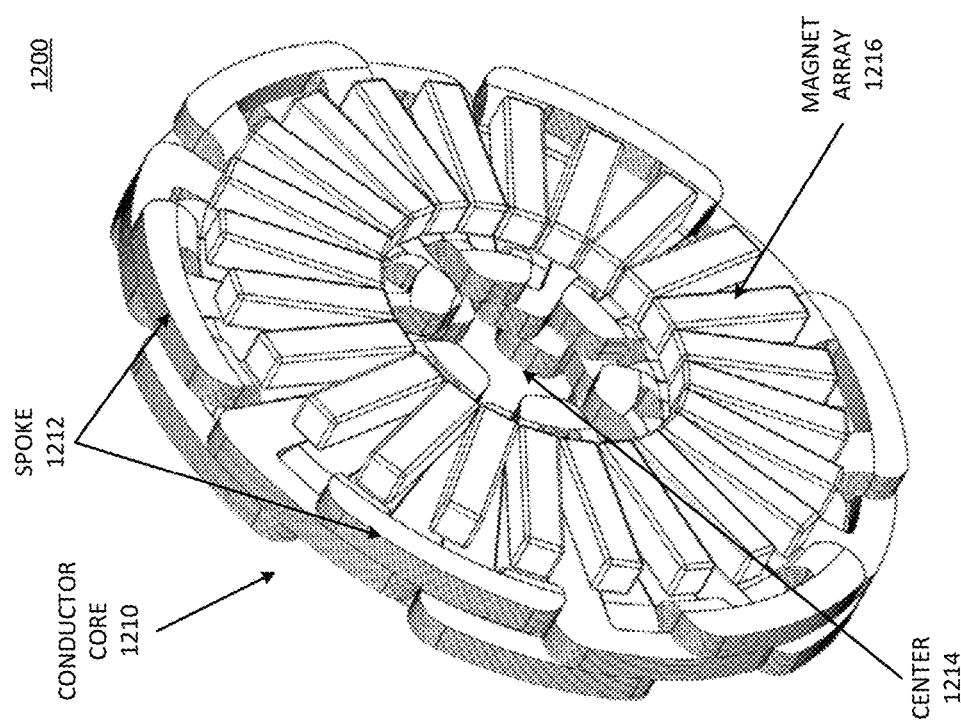
FIG. 12A is a diagram of an embodiment of a motor assembly with layers of conductors in a serpentine path adjacent a Halbach array.

FIG. 12A is a diagram of an embodiment of a motor assembly with layers of conductors in a serpentine path adjacent a Halbach array. Assembly 1200 provides an example of a motor assembly with coated conductor layers in accordance with any embodiment described herein. Assembly 1200 includes six segments with spokes 1212, with a relatively high number of magnetic poles provided by magnet array 1216. Magnet array 1216 provides one example of an array with gaps between the magnets. Conductor core 1210 includes stacks of coated conductor with center 1214 for a shaft or axle. A complex or spiral serpentine path for the current can increase the voltage requirements for assembly 1200, as will the increased number of magnetic poles. The connections between layers may be done externally with a circuit board, by welding connections on the layers, or through mechanical bonding. The stacks of conductor can be considered conductor plates, which stack to provide a dense conducting path that minimizes resistive losses. The surface of conductor core 1210 can act as a heat exchanger to draw heat out from the hotter center region.

In one embodiment, assembly 1200 is part of a motor. Consider an example of a robotic device with the initial motion of a joint. To produce the torque required to move from a dead stop to lifting a mass, the initial power required to accelerate the arm and mass will be high, but once in motion, the power to continue at a constant velocity will be a tiny fraction of the initial power to overcome bearing losses. The initial or periodic motion of starting and stopping is much higher than the average power, requiring several times the average power requirements. However, it will be understood that the higher power is only needed for a relatively short period of time, such as a few seconds.

In one embodiment, the structure of assembly 1200 can allow the overdriving of the motor, with current or voltage or both that would be high enough to cause a failure if sustained. However, by driving the current or voltage or both for only a brief period and then allowing several seconds for cooling, the system can sustain high power period, while allowing for a smaller, lighter overall motor. The structure of assembly 1200 provides increased thermal conductivity between layers, which improves cooling. Additionally, in one embodiment, the motor can be driven with temporary power surges with less likelihood of overheating. The reduced likelihood of overheating allows the use of a smaller motor than would traditionally be used, because such a motor can temporarily be driven with excess current. The overdriving can be double or more the steady state usage. Use of a smaller motor reduces costs and reduces the motor weight, extending the applications of an electric motor in accordance with assembly 1200. Normally a motor is sized to the peak performance requirements even if it is used less than ten percent of the time. Such motor sizing adds excess weight, costs, and complexity. By sizing a motor to the average required load because of the ability to temporarily overdrive the motor to drive the peak requirements, the design can use a smaller, lighter, more cost effective motor without sacrificing performance.

For example, similar to the power required for initially moving a robotic appendage or joint, the power required for vertical takeoff and landing of electric aircraft during takeoff or maneuvering might exceed the requirements for cruising. A motor with a stator of stacked coils in accordance with assembly 1200 can withstand the high heat output and possible lower efficiencies for short durations. Once the desired altitude or steady state operation is reached, the motor controller can lower the power output, and operate within a motor's designed optimal efficiency range. Similarly, for accelerating an electric vehicle away from a stop, the electric vehicle might need five times the nominal power, for example, four wheels with 10 kilowatts nominal per wheel rating, can produce 200 kilowatts of power (268 Horsepower) for a few seconds. The same motors can provide high efficiency operation while driving at 55 miles per hour, which being lighter and smaller, and therefore resulting in less un-sprung mass than a nominal 50 kilowatt motor per wheel.

FIG. 12B is a diagram of an embodiment of a motor assembly with layers of conductors and a housing. System 1220 provides one example of a motor assembly in accordance with an embodiment of assembly 1200 of FIG. 12A. System 1220 illustrates conductor core 1232 having spokes 1222 centered on center 1224, which can be the location of a shaft or axle. System 1220 includes magnet array 1234 adjacent conductor core 1232. System 1220 also illustrates housing 1236, which represents a metal or ceramic or other heat resistant housing. In one embodiment, housing 1236 holds the magnets of magnet array 1234 in place. Housing 1236 can be larger than what is shown, and for example, can cover all of conductor core 1232.

In one embodiment, system 1220 includes connectors 1242 and 1244 to connect different layers or different conductor stacks, or both. In an embodiment where multiple phases are used, connectors 1242 and 1244 can provide connection points to different phases. In one embodiment, connectors 1242 or 1244 or both can be on the inside of the assembly, closer to center 1224. While not specifically shown, it will be understood that system 1220 can include one or more bearings for a shaft. In an embodiment where the connectors are in center 1224, system 1220 can include one or more bearings around the outside of the conductor core.

Figure 13A:
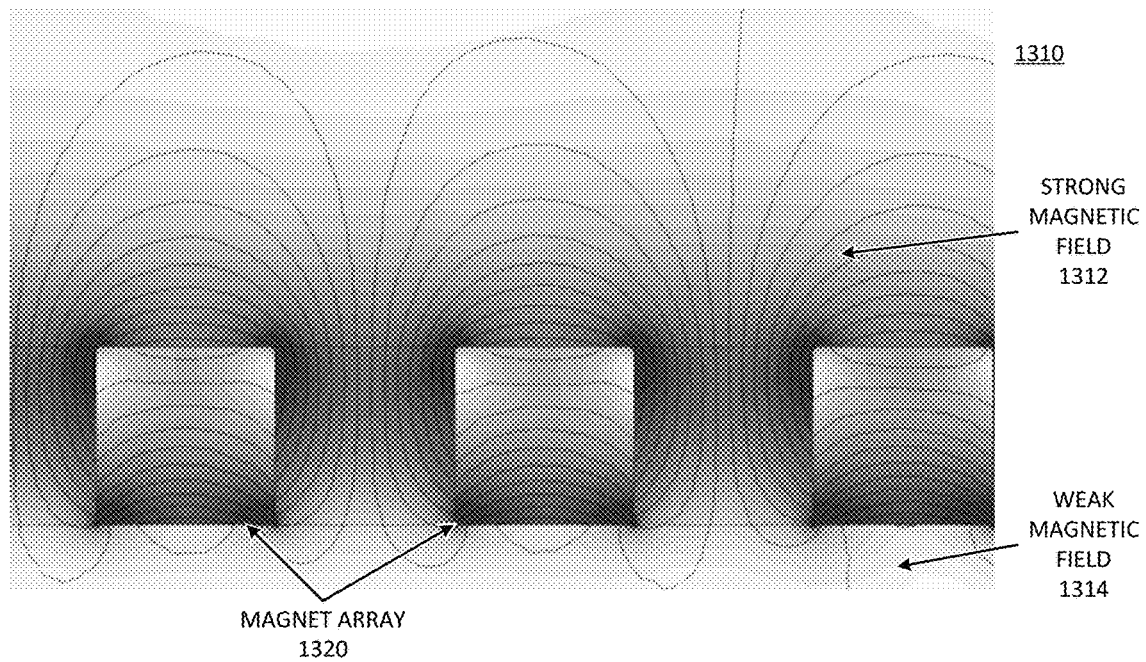
FIG. 13A is a diagram of an embodiment of a magnetostatic finite element simulation of a linear Halbach array.

FIG. 13A is a diagram of an embodiment of a magnetostatic finite element simulation of a linear Halbach array. Diagram 1310 illustrates magnetic field lines for a magnetostatic finite element simulation of a linear Halbach array. The Halbach array of magnet array 1320 reduces losses by concentrating the field on one side, reducing the need for back iron, and allowing linear, radial, and axial motor designs without steel laminations. The elimination of the back iron reduces cogging and eddy current losses. As described herein, the Halbach array can be employed with stacked coated conductor. Diagram 1310 illustrates strong magnetic field 1312 on one side of magnet array 1320, and weak magnetic field 1314 on the other side of magnet array 1320. The darker shading illustrates more intense magnetic fields. The stator would be positioned on the side of strong magnetic field 1312.

Traditional motors often have silicon steel laminations that leverage the increased magnetic permeability of steel or other suitable materials over air. However, these laminations have several downsides that offset the increased field strength. They have hysteresis losses as the fields switch back and forth during motor commutation, they saturate, limiting the maximum field that can be produced, they add weight, and they occupy volume that could be used for additional conductors. In some electromotive machines such as Permanent Magnet Axial Flux motors by way of example, by eliminating the steel laminations, stators based on stacks of coated conductor as described herein can replace freed up volume with more conductors. Increasing the conductor increases the reluctance, but given the same current flowing, produces additional magnetic force. If space is available, advanced designs for axial flux motors can be optimized with additional poles, additional magnetic material, additional conductors, and increased radius, producing greater power and torque for a given volume and weight. The same motors can require higher switching speeds, voltages, and magnetic poles and material. If the magnetic fields can be produced by the conductor with lower losses and heat produced, the system benefits. Such a tradeoff can result in efficiencies well over ninety percent in motors. A stator in accordance with what is described herein can provide a motor that is cost-effective to produce as well as being efficient.

Figure 13B:
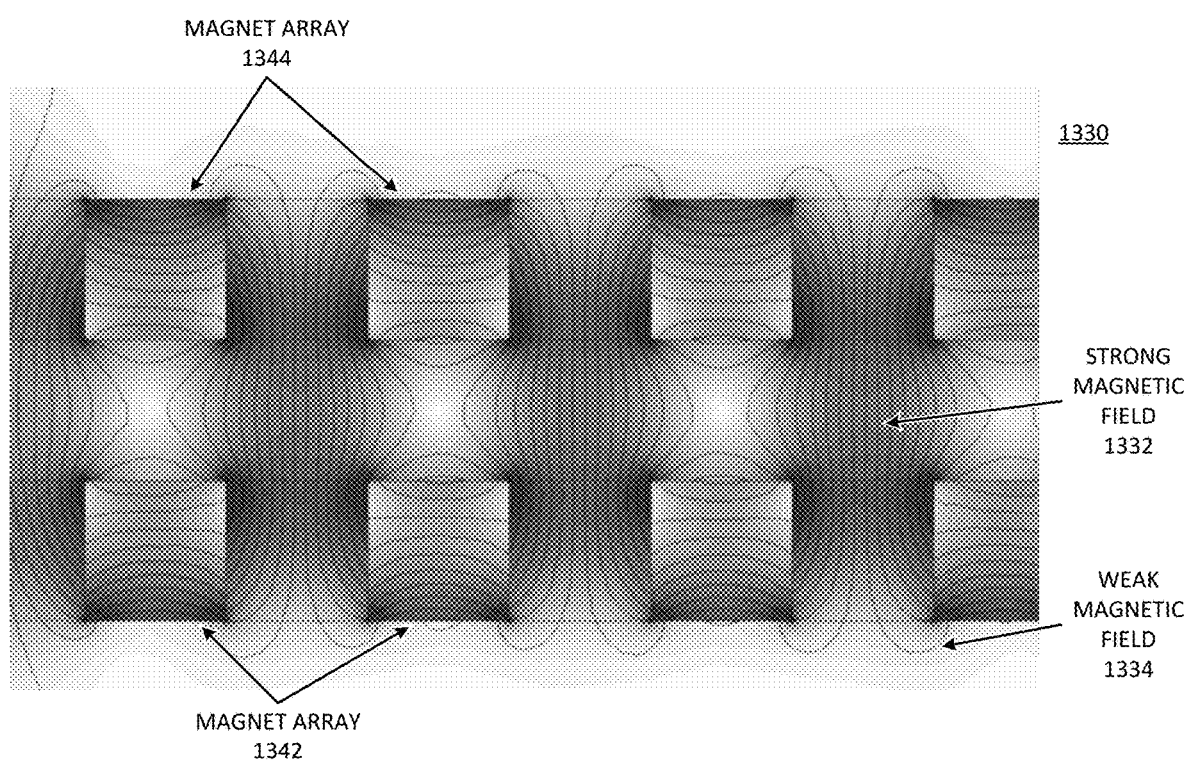
FIG. 13B is a diagram of an embodiment of a magnetostatic finite element simulation of a dual Halbach array.

FIG. 13B is a diagram of an embodiment of a magnetostatic finite element simulation of a dual Halbach array. Diagram 1330 illustrates magnetic field lines for a magnetostatic finite element simulation of two linear Halbach arrays facing each other. The Halbach arrays of magnet array 1342 and magnet array 1344 reduce losses by concentrating the field between the arrays. A motor with the dual Halbach array and coated conductors as described herein can reduce the need for back iron, and enable linear, radial, and axial motor designs without steel laminations. Diagram 1330 illustrates strong magnetic field 1332 on facing sides of magnet array 1342 and magnet array 1344. There are weak magnetic fields 1334 on the non-facing sides of magnet array 1342 and magnet array 1344. The darker shading illustrates more intense magnetic fields. The stator would be positioned between the magnet arrays in strong magnetic field 1332. In an embodiment with dual magnet arrays, the arrays can be positioned with one or more housing elements, and spaced with air gaps between the magnet arrays and the flat portion of the stator assembly.

Figure 14:
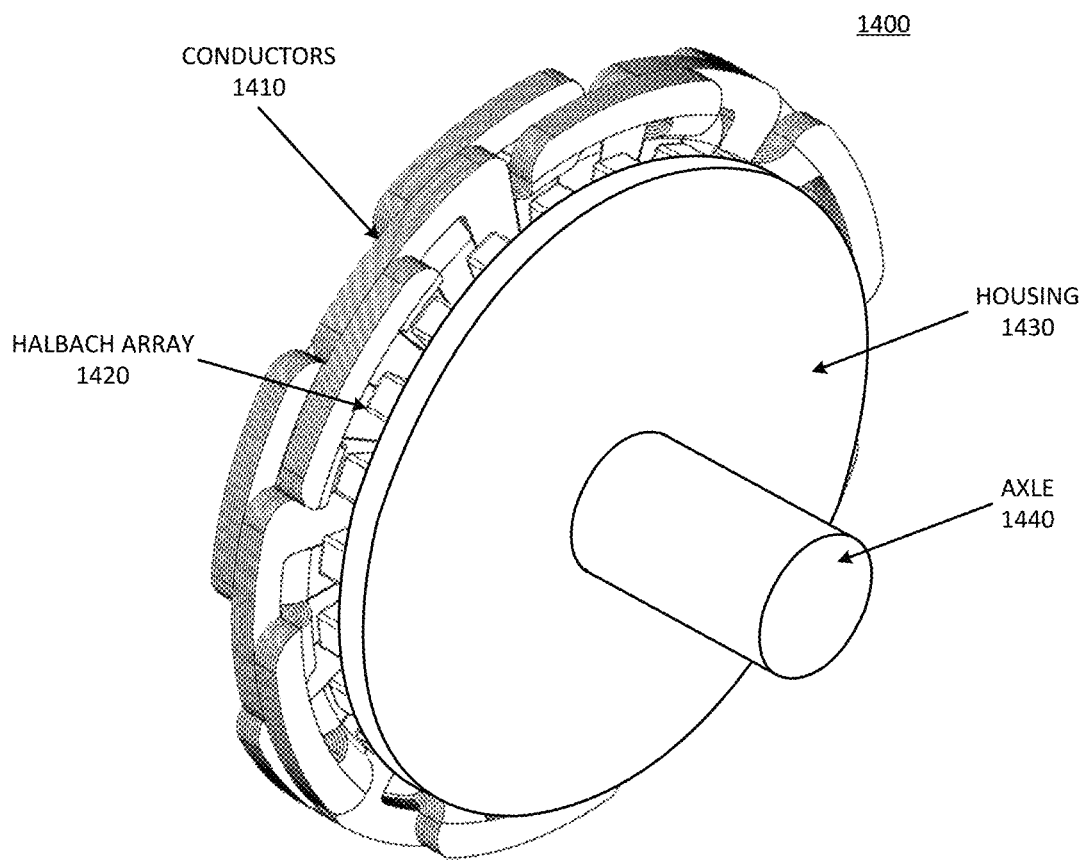
FIG. 14 is a diagram of an embodiment of a motor assembly.

FIG. 14 is a diagram of an embodiment of a motor assembly. Assembly 1400 illustrates an assembly in which an axle or shaft is illustrated. More specifically, assembly 1400 includes conductors 1410, which are coated conductors in accordance with any embodiment described herein. Assembly 1400 includes Halbach array 1420 held in place by housing 1430. Axle 1440 represents a shaft or axle that interfaces at the center of the stator assembly. It will be understood that a practical implementation of assembly 1400 would typically be fully enclosed, with bearings between moving and stationary elements. In some motor designs, the shaft is fixed to the stator assembly. In other motor designs, the shaft rotates relative to a stationary stator assembly. Assembly 1400 can support either type of motor design. In one embodiment, the motor assembly of assembly 1400 comprises a linear motor.

For example, assembly 1400 can include or be modified to include a mechanical mounting to couple the stator assembly to axle 1440. In such a design a rotor can rotate freely around the shaft. Such a design can be useful for an in wheel motor application. In another example, assembly 1400 can include or be modified to include a mechanical mounting to couple the stator assembly to a motor housing. In such a design a rotor can be fixed to axle 1440.

In one aspect, a stator assembly includes: a magnet assembly having magnets in a first plane in a radial pattern around a stator center point; and a stator core adjacent the magnet assembly, the stator core having a stack of multiple layers of coated conductor, wherein the conductor has a rectangular cross section, with an insulative coating chemically bonded to the conductor.

In one embodiment, the rectangular cross section varies from a smaller area at a point closer to the stator center point to a larger area at a point farther from the stator center point. In one embodiment, the conductor comprises patterned sheet metal. In one embodiment, the conductor comprises aluminum and the coating comprises sapphire. In one embodiment, the conductor comprises copper and the coating comprises diamond. In one embodiment, a layer of conductor includes multiple spokes, with a spoke electrically coupled proximate the stator center point to an adjacent spoke of the layer, and electrically coupled proximate a stator outer edge to a different adjacent spoke of the layer. In one embodiment, the stator having a plurality of stacks of multiple layers of coated conductor. In one embodiment, the plurality of stacks comprises a first stack to nest with a second stack, wherein spokes of the first stack interleave adjacent to and substantially coplanar with spokes of the second stack. In one embodiment, the plurality of stacks comprises a first stack having a first phase, and a second stack having a second phase different from the first phase. In one embodiment, the spokes include multiple parallel current paths aligned orthogonal to motion of magnetic poles of the first and second magnet assemblies. In one embodiment, the multiple parallel current paths of the spokes join to a single current path to electrically couple proximate the stator center point and join to a single current path to electrically couple proximate the stator outer edge. In one embodiment, the multiple layers of conductor comprise coils of metal in a serpentine shape where the coils fold over each other. In one embodiment, at least two of the layers of conductor are connected in parallel. In one embodiment, at least two of the layers of conductor are connected in series. In one embodiment, the magnet assembly comprises a first magnet assembly, and further comprising: a second magnet assembly having magnets in a second plane parallel to the first plane in a radial pattern around the stator center point; wherein the stator core is between the first and second magnet assemblies.

In one aspect, a motor assembly includes: a motor housing; a rotor; a shaft; and a stator assembly including a first magnet assembly having magnets in a first plane in a radial pattern around a stator center point; a second magnet assembly having magnets in a second plane parallel to the first plane in a radial pattern around the stator center point; and a stator core between the first and second magnet assemblies, the stator core having a stack of multiple layers of coated conductor, wherein the conductor has a rectangular cross section, with an insulative coating chemically bonded to the conductor.

In one embodiment, a layer of conductor includes multiple spokes, with a spoke electrically coupled proximate the stator center point to an adjacent spoke of the layer, and electrically coupled proximate a stator outer edge to a different adjacent spoke of the layer, and wherein the conductor comprises aluminum and the coating comprises sapphire. In one embodiment, the motor assembly comprises a linear motor. In one embodiment, further comprising: a mechanical mounting to couple the stator assembly to the shaft, where the rotor rotates freely around the shaft, wherein adjacent layers of the stator core connect proximate the stator center to each other. In one embodiment, the motor assembly comprises a motor of an in wheel motor. In one embodiment, further comprising: a mechanical mounting to couple the stator assembly to the motor housing, where the rotor is fixed to the shaft, wherein adjacent layers of the stator core connect proximate a stator outer edge to each other. In one embodiment, the rectangular cross section varies from a smaller area at a point closer to the stator center point to a larger area at a point farther from the stator center point. In one embodiment, the conductor comprises patterned sheet metal. In one embodiment, the conductor comprises aluminum and the coating comprises sapphire. In one embodiment, the conductor comprises copper and the coating comprises diamond. In one embodiment, a layer of conductor includes multiple spokes, with a spoke electrically coupled proximate the stator center point to an adjacent spoke of the layer, and electrically coupled proximate a stator outer edge to a different adjacent spoke of the layer. In one embodiment, the stator having a plurality of stacks of multiple layers of coated conductor. In one embodiment, the plurality of stacks comprises a first stack to nest with a second stack, wherein spokes of the first stack interleave adjacent to and substantially coplanar with spokes of the second stack. In one embodiment, the plurality of stacks comprises a first stack having a first phase, and a second stack having a second phase different from the first phase. In one embodiment, the spokes include multiple parallel current paths aligned orthogonal to motion of magnetic poles of the first and second magnet assemblies. In one embodiment, the multiple parallel current paths of the spokes join to a single current path to electrically couple proximate the stator center point and join to a single current path to electrically couple proximate the stator outer edge. In one embodiment, the multiple layers of conductor comprise coils of metal in a serpentine shape where the coils fold over each other. In one embodiment, at least two of the layers of conductor are connected in parallel. In one embodiment, at least two of the layers of conductor are connected in series. In one embodiment, the magnet assembly comprises a first magnet assembly, and further comprising: a second magnet assembly having magnets in a second plane parallel to the first plane in a radial pattern around the stator center point; wherein the stator core is between the first and second magnet assemblies.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A stator assembly, comprising:
    a magnet assembly having permanent magnets in a first plane in a radial pattern around a stator center point; and
    a stator core adjacent the magnet assembly, the stator core having a plurality of stacks, each stack of multiple layers of coated conductor having multiple spokes, with a spoke electrically coupled with an inner connection proximate the stator center point to an adjacent spoke of the layer, and electrically coupled with an outer connection proximate a stator outer edge to a different adjacent spoke of the layer, wherein the conductor has a rectangular cross section wherein the spoke has a varying width narrower toward the inner connection and wider toward the outer connection, the coated conductor having a non-metal element chemically bonded to the conductor to generate an insulative coating layer on the conductor,
    wherein the plurality of stacks includes a first stack, a second stack, and a third stack, the three stacks to nest with each other, wherein between two spokes of the first stack one spoke of the second stack and one spoke of the third stack interleave adjacent to each other with the two spokes of the first stack, the one of the second stack, and the one spoke of the third stack to be in a second plane parallel to the first plane, wherein the inner connection and outer connection of the first stack are coplanar with the first plane,
    wherein spokes of the second stack include a bend, with the inner connection of the second stack to rest on top of the inner connection of the first stack and the outer connection of the second stack to rest on top of the outer connection of the first stack, and
    wherein spokes of the third stack include a bend, with the inner connection of the first stack to rest on top of the inner connection of the third stack and the outer connection of the first stack to rest on top of the outer connection of the third stack.

2. The stator assembly of claim 1, wherein the rectangular cross section varies from a smaller area at a point closer to the stator center point to a larger area at a point farther from the stator center point.

3. The stator assembly of claim 1, wherein the conductor comprises patterned sheet metal.

4. The stator assembly of claim 1, wherein the conductor comprises aluminum and the non-metal element comprises oxygen, to create a sapphire coating on the aluminum conductor.

5. The stator assembly of claim 1, wherein the conductor comprises copper and the non-metal element comprises carbon, to create a diamond coating on the copper conductor.

6. The stator assembly of claim 1, wherein the plurality of stacks comprises the first stack having a first electrical phase, the second stack having a second electrical phase different from the first electrical phase, and the third stack having a third phase different from the first electrical phase or the second electrical phase.

7. The stator assembly of claim 1, wherein the spokes include multiple parallel current paths aligned orthogonal to motion of magnetic poles of the first and second magnet assemblies.

8. The stator assembly of claim 7, wherein the multiple parallel current paths of the spokes join to a single current path to electrically couple proximate the stator center point and join to a single current path to electrically couple proximate the stator outer edge.

9. The stator assembly of claim 1, wherein the multiple layers of conductor comprise coils of metal in a serpentine shape where the coils fold over each other.

10. The stator assembly of claim 1, wherein at least two of the layers of conductor are connected in parallel.

11. The stator assembly of claim 1, wherein at least two of the layers of conductor are connected in series.

12. The stator assembly of claim 1, wherein the magnet assembly comprises a first magnet assembly, and further comprising:
    a second magnet assembly having magnets in a third plane parallel to the first plane in a radial pattern around the stator center point;
    wherein the stator core is between the first and second magnet assemblies.

13. The stator assembly of claim 1, wherein the first stack, the second stack, and the third stack nest with each other with substantially no gaps between spokes of the first stack, spokes of the second stack, and spokes of the third stack.

14. The stator assembly of claim 1, wherein a physical length of the conductor of the first stack is shorter than a physical length of the conductor of the second stack and the third stack, wherein the physical length of the conductor of the second stack is equal to the physical length of the conductor of the third stack.

15. The stator assembly of claim 14, wherein a stator controller is to drive charge through the first stack, the second stack, and the third stack to account for differences in the physical length of the respective conductors.

16. A motor assembly, comprising:
    a motor housing;
    a rotor;
    a shaft; and
    a stator assembly including
        a first magnet assembly having magnets in a first plane in a radial pattern around a stator center point;
        a second magnet assembly having magnets in a second plane parallel to the first plane in a radial pattern around the stator center point; and
        a stator core between the first magnet assembly and the second magnet assembly, the stator core having a plurality of stacks, each stack of multiple layers of coated conductor having multiple spokes, with a spoke electrically coupled with an inner connection proximate the stator center point to an adjacent spoke of the layer, and electrically coupled with an outer connection proximate a stator outer edge to a different adjacent spoke of the layer, wherein the conductor has a rectangular cross section wherein the spoke has a varying width narrower toward the inner connection and wider toward the outer connection, the coated conductor having a non-metal element chemically bonded to the conductor to generate an insulative coating layer on the conductor,
    wherein the plurality of stacks includes a first stack, a second stack, and a third stack, the three stacks to nest with each other, wherein between two spokes of the first stack one spoke of the second stack and one spoke of the third stack interleave adjacent to each other with the two spokes of the first stack, the one of the second stack, and the one spoke of the third stack to be in a third plane parallel to the first plane, wherein the inner connection and outer connection of the first stack are coplanar with the first plane,
    wherein spokes of the second stack include a bend, with the inner connection of the second stack to rest on top of the inner connection of the first stack and the outer connection of the second stack to rest on top of the outer connection of the first stack, and
    wherein spokes of the third stack include a bend, with the inner connection of the first stack to rest on top of the inner connection of the third stack and the outer connection of the first stack to rest on top of the outer connection of the third stack.

17. The motor assembly of claim 16, wherein the motor assembly comprises a linear motor.

18. The motor assembly of claim 16, further comprising:
    a mechanical mounting to couple the stator assembly to the shaft, where the rotor rotates freely around the shaft, wherein adjacent layers of the stator core connect proximate the stator center to each other.

19. The motor assembly of claim 18, wherein the motor assembly comprises a motor of an in wheel motor.

20. The motor assembly of claim 16, further comprising:
    a mechanical mounting to couple the stator assembly to the motor housing, where the rotor is fixed to the shaft, wherein adjacent layers of the stator core connect proximate a stator outer edge to each other.

21. The motor assembly of claim 16, wherein the conductor comprises aluminum and the non-metal element comprises oxygen, to create a sapphire coating on the aluminum conductor.

22. The motor assembly of claim 16, wherein the conductor comprises copper and the non-metal element comprises carbon, to create a diamond coating on the copper conductor.

23. The motor assembly of claim 16, wherein the first stack, the second stack, and the third stack nest with each other with substantially no gaps between spokes of the first stack, spokes of the second stack, and spokes of the third stack.

24. The motor assembly of claim 16, wherein a physical length of the conductor of the first stack is shorter than a physical length of the conductor of the second stack and the third stack, wherein the physical length of the conductor of the second stack is equal to the physical length of the conductor of the third stack.

25. The motor assembly of claim 24, further comprising:
    a stator controller is to drive charge through the first stack, the second stack, and the third stack to account for differences in the physical length of the respective conductors.

* * * * *